(12) United States Patent
Suh et al.

(10) Patent No.: US 9,544,639 B2
(45) Date of Patent: *Jan. 10, 2017

(54) APPARATUS OF PROCESSING AN IMAGE AND A METHOD OF PROCESSING THEREOF

(71) Applicant: LG Electronics Inc., Seoul (KR)

(72) Inventors: Jong Yeul Suh, Seoul (KR); Jin Pil Kim, Seoul (KR); Jee Hyun Choe, Seoul (KR); Ho Taek Hong, Seoul (KR); Kwan Suk Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/660,472

(22) Filed: Mar. 17, 2015

(65) Prior Publication Data

US 2015/0195507 A1 Jul. 9, 2015

Related U.S. Application Data

(63) Continuation of application No. 13/097,986, filed on Apr. 29, 2011, now Pat. No. 9,013,547.

(Continued)

(51) Int. Cl.
*H04N 13/00* (2006.01)
*H04N 13/02* (2006.01)
(Continued)

(52) U.S. Cl.
CPC ........ *H04N 21/435* (2013.01); *H04N 13/0003* (2013.01); *H04N 13/004* (2013.01);
(Continued)

(58) Field of Classification Search
USPC .......................... 375/240.1; 348/43, E13.074
See application file for complete search history.

(56) References Cited

U.S. PATENT DOCUMENTS

2003/0156188 A1 8/2003 Abrams, Jr.
2007/0041443 A1 2/2007 Ha et al. .................. 375/240.15
(Continued)

FOREIGN PATENT DOCUMENTS

CN 1613263 A 5/2005
CN 101632313 A 1/2010
(Continued)

OTHER PUBLICATIONS

DVB Organization: "CM-3DTV0002.1TU report on 3DTV", Radiocommunication Study Groups, Geneva, Switzerland, Nov. 12, 2009, XP17830971 CD.*

(Continued)

*Primary Examiner* — Christopher S Kelley
*Assistant Examiner* — Ana Picon-Feliciano
(74) *Attorney, Agent, or Firm* — Dentons US LLP

(57) ABSTRACT

The disclosure is disclosed an apparatus of processing an image and a method thereof. According to the present invention, the method of transmitting a broadcast signal for 3-dimensional, 3D, service, may include encoding video data for a 3D service into a stream, generating first service information including a first descriptor including first information for specifying that a type of the stream is a video stream and second information for specifying a type of a component included in the video stream is a 3D video component and transmitting a broadcast signal including the encoded stream and the generated service information.

8 Claims, 20 Drawing Sheets

Related U.S. Application Data

(60) Provisional application No. 61/329,571, filed on Apr. 30, 2010.

(51) Int. Cl.
  *H04N 21/435* (2011.01)
  *H04N 21/235* (2011.01)
  *H04N 21/2362* (2011.01)
  *H04N 21/434* (2011.01)
  *H04N 13/04* (2006.01)

(52) U.S. Cl.
  CPC ....... *H04N 13/007* (2013.01); *H04N 13/0007* (2013.01); *H04N 13/0044* (2013.01); *H04N 13/0048* (2013.01); *H04N 13/0051* (2013.01); *H04N 13/0059* (2013.01); *H04N 13/0066* (2013.01); *H04N 13/0454* (2013.01); *H04N 21/235* (2013.01); *H04N 21/2362* (2013.01); *H04N 21/4345* (2013.01)

(56) References Cited

U.S. PATENT DOCUMENTS

| | | | |
|---|---|---|---|
| 2008/0232680 A1 | 9/2008 | Berestov et al. | |
| 2008/0244678 A1 | 10/2008 | Kim et al. | 725/118 |
| 2009/0029670 A1 | 1/2009 | Cho et al. | 455/344 |
| 2009/0034656 A1 | 2/2009 | Cho et al. | 375/316 |
| 2009/0040372 A1 | 2/2009 | Bae et al. | 348/436.1 |
| 2009/0181612 A1 | 7/2009 | May | 455/3.01 |
| 2009/0245347 A1* | 10/2009 | Lee | H04N 13/0048 375/240.01 |
| 2009/0324202 A1* | 12/2009 | Okubo | G11B 27/10 386/244 |
| 2010/0165077 A1* | 7/2010 | Yin et al. | 348/42 |
| 2010/0246662 A1 | 9/2010 | Koto et al. | |
| 2010/0260268 A1* | 10/2010 | Cowan et al. | 375/240.25 |
| 2010/0260484 A1* | 10/2010 | Hattori | 386/108 |
| 2010/0271462 A1 | 10/2010 | Gutierrez Novelo | 348/43 |
| 2010/0309286 A1* | 12/2010 | Chen | H04N 13/0059 348/43 |
| 2010/0316134 A1* | 12/2010 | Chen et al. | 375/240.25 |
| 2011/0001792 A1 | 1/2011 | Pandit et al. | 348/43 |
| 2011/0023066 A1 | 1/2011 | Jang et al. | 725/54 |
| 2011/0063409 A1* | 3/2011 | Hannuksela | H04N 19/597 348/42 |
| 2011/0074922 A1 | 3/2011 | Chen et al. | |
| 2011/0119708 A1 | 5/2011 | Lee et al. | |
| 2011/0181693 A1* | 7/2011 | Lee | H04N 19/597 348/43 |
| 2011/0181694 A1* | 7/2011 | Kim | H04N 13/0048 348/42 |

FOREIGN PATENT DOCUMENTS

| | | |
|---|---|---|
| EP | 2 373 042 A1 | 10/2011 |
| JP | 2005-6114 A | 1/2005 |
| KR | 10-2008-0053194 A | 6/2008 |
| KR | 2008053194 A | 6/2008 |
| KR | 10-2008-0099109 A | 11/2008 |
| WO | WO 2005/114998 | 12/2005 |
| WO | WO 2005114998 A1 | 12/2005 |
| WO | WO 2007/066868 A1 | 6/2007 |
| WO | 2008/156318 A2 | 12/2008 |
| WO | WO 2009/075418 A1 | 6/2009 |

OTHER PUBLICATIONS

ISO/IEC 14496-10:2009/FDAM Information technology—Coding of audio-visual objects—Part 10: Advanced Video Coding, Amendment 1: Constrained baseline profile, stereo high profile and frame packing arrangement SEI message, ISO/IEC JTC 1/SC 29, Nov. 30, 2009, published by ISO/IEC.*

ISO/IEC 14496-10:2009/FDAM (Information technology-Coding of audio-visual objects-Part 10: Advanced Video Coding, Amendment 1: Constrained baseline profile, stereo high profile and frame packing arrangement SEI message, ISO/IEC JTC 1/SC 29, Nov. 30, 2009, published by ISO/IEC).*

ETSI EN 300 468 V1.11.1 (Dec. 2009), Digital Video Broadcasting (DVB); Specification for Service Information (SI) in DVB systems, Section 6.2.19.

DVB Organization: "Report of the First Meeting of the DVB TM-3DTV Group", Jan. 27, 2010, Geneva, Switzerland, XP017831661.

DVB: "Specification for Service Information (SI) in DVB Systems", Final Draft ETSI EN 300 468 V1.11.1, Dec. 2009, XP014044852.

Machine Translation of KR 2008053194 A.

Dvb:"Digital Video Broadcasting (DVB); Specification for Service Information (SI) in DVB systems DVB, Document A 38", Jan. 31, 2011, pp. 1-157, XP055053275.

ETSI: "Digital Video Broadcasting (DVB); Frame Compatible Plano-Stereoscopic 3DTV (DVB-3DTV)", DVB Document A154, Feb. 28, 2011, pp. 1-28, Retrieved from the Internet: URL:http://www.dvd.org/technology/standards/a154_DVB-3DTV_Spec.pdf [retrieved on Feb. 27, 2012], XP55020342.

Lee et al. "A structure for 2D/3D Mixed Service based on Terrestrial DMB System", 3DTV Conference, IEEE, May 2007, XP031158177.

DVB Organization: "CM-3DTV0002.ITU report on 3DTV", Radiocommunication Study Groups, Geneva, Switzerland, Nov. 12, 2009, XP17830971.

* cited by examiner

FIG. 3

| Syntax | Number of bits | Identifier |
|---|---|---|
| network_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   network_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   reserved_future_use | 4 | bslbf |
|   network_descriptors_length | 12 | uimsbf |
|   for(i=0;i<N;i++){ | | |
|     descriptor() | | |
|   } | | |
|   reserved_future_use | 4 | bslbf |
|   transport_stream_loop_length | 12 | uimsbf |
|   for(i=0;i<N;i++){ | | |
|     transport_stream_id | 16 | uimsbf |
|     original_network_id | 16 | uimsbf |
|     reserved_future_use | 4 | bslbf |
|     transport_descriptors_length | 12 | uimsbf |
|     for(j=0;j<N;j++){ | | |
|       descriptor() | | |
|     } | | |
|   } | | |
|   CRC_32 | 32 | rpchof |
| } | | |

FIG. 4

| Syntax | Number of bits | Identifier |
|---|---|---|
| service_list_descriptor(){ | | |
|   descriptor_tag | 8 | uimsbf |
|   descriptor_length | 8 | uimsbf |
|   for (i=0;i<N;I++){ | | |
|     service_id | 16 | uimsbf |
|     service_type | 8 | uimsbf |
|   } | | |
| } | | |

FIG. 5

| Syntax | Number of bits | Identifier |
|---|---|---|
| service_description_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   transport_stream_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   original_network_id | 16 | uimsbf |
|   reserved_future_use | 8 | bslbf |
|   for (i=0;i<N;i++){ | | |
|     service_id | 16 | uimsbf |
|     reserved_future_use | 6 | bslbf |
|     EIT_schedule_flag | 1 | bslbf |
|     EIT_present_following_flag | 1 | bslbf |
|     running_status | 3 | uimsbf |
|     free_CA_mode | 1 | bslbf |
|     descriptors_loop_length | 12 | uimsbf |
|     for (j=0;j<N;j++){ | | |
|       descriptor() | | |
|     } | | |
|   } | | |
|   CRC_32 | 32 | rpchof |
| } | | |

FIG. 6

| Syntax | Number of bits | Identifier |
|---|---|---|
| service_descriptor(){ | | |
|   descriptor_tag | 8 | uimsbf |
|   descriptor_length | 8 | uimsbf |
|   service_type | 8 | uimsbf |
|   service_provider_name_length | 8 | uimsbf |
|   for (i=0;i<N;I++){ | | |
|     char | 8 | uimsbf |
|   } | | |
|   service_name_length | 8 | uimsbf |
|   for (i=0;i<N;I++){ | | |
|     char | 8 | uimsbf |
|   } | | |
| } | | |

FIG. 7

| Syntax | Number of bits | Identifier |
|---|---|---|
| TS_program_map_section() { | | |
|   table_id | 8 | uimsbf |
|   '0' | 1 | bslbf |
|   reserved | 1 | bslbf |
|   section_length | 2 | bslbf |
|   program_number | 12 | uimsbf |
|   reserved | 16 | uimsbf |
|   version_number | 5 | bslbf |
|   current_next_indicator | 1 | bslbf |
|   section_number | 8 | uimsbf |
|   last_section_number | 8 | uimsbf |
|   reserved | 3 | bslbf |
|   PCR_PID | 13 | uimsbf |
|   reserved | 4 | bslbf |
|   program_info_length | 12 | uimsbf |
|   for (i = 0; i < N; i++) { | | |
|     descriptor() | | |
|   } | | |
|   for (i = 0; i < N1; i++) { | | |
|     stream_type | 8 | uimsbf |
|     reserved | 3 | bslbf |
|     elementary_PID | 13 | uimsbf |
|     reserved | 4 | bslbf |
|     ES_info_length | 12 | uimsbf |
|     for (i = 0; i < N2; i++) { | | |
|       descriptor() | | |
|     } | | |
|   } | | |
|   CRC_32 | 32 | rpchof |
| } | | |

FIG. 8

| Syntax | Number of bits | Identifier |
|---|---|---|
| event_information_section(){ | | |
|   table_id | 8 | uimsbf |
|   section_syntax_indicator | 1 | bslbf |
|   reserved_future_use | 1 | bslbf |
|   reserved | 2 | bslbf |
|   section_length | 12 | uimsbf |
|   service_id | 16 | uimsbf |
|   reserved | 2 | bslbf |
|   version_number | 5 | uimsbf |
|   current_next_indicator | 1 | bslbf |
|   section_number | 8 | uimsbf |
|   last_section_number | 8 | uimsbf |
|   transport_stream_id | 16 | uimsbf |
|   original_network_id | 16 | uimsbf |
|   segment_last_section_number | 8 | uimsbf |
|   last_table_id | 8 | uimsbf |
|   for(i=0;i<N;i++){ | | |
|     event_id | 16 | uimsbf |
|     start_time | 40 | bslbf |
|     duration | 24 | uimsbf |
|     running_status | 3 | uimsbf |
|     free_CA_mode | 1 | bslbf |
|     descriptors_loop_length | 12 | uimsbf |
|     for(i=0;i<N;i++){ | | |
|       descriptor() | | |
|     } | | |
|   } | | |
|   CRC_32 | 32 | rpchof |
| } | | |

FIG. 9

| Syntax | Number of bits | Format |
| --- | --- | --- |
| 3D_service_descriptor(){ | | |
|    descriptor_tag | 8 | 0×TBD |
|    descriptor_length | 8 | uimsbf |
|    reserved | 2 | '11' |
|    3D_structure | 4 | uimsbf |
|    3D_metadata_location_flag | 2 | bslbf |
|    reserved | 2 | '11' |
|    3D_sampling | 4 | uimsbf |
|    3D_orientation | 2 | uimsbf |
|    reserved | 2 | '11' |
|    if(3D_metadata_exist_flag='01'){ | | |
|      3D_metadata_type | 3 | uimsbf |
|      3D_metadata_length | 5 | uimsbf |
|      for (i=0;i<3D_metadata_length;i++){ | | |
|         3D_metadata[i] | 16 | uimsbf |
|      } | | |
|    } | | |
| } | | |

FIG. 10
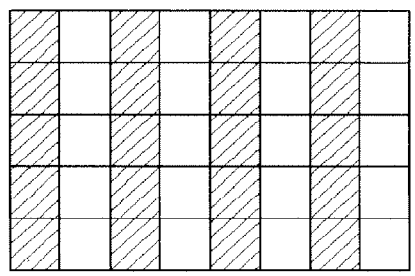
Odd position
(a)
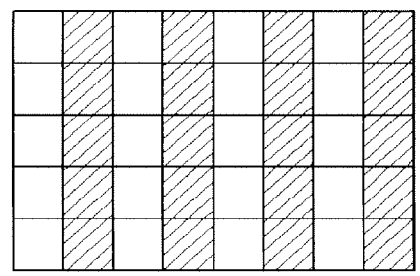
Even position
(b)
FIG. 11
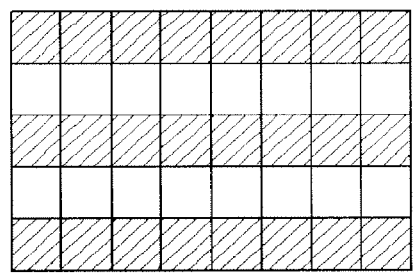
Odd position
(a)
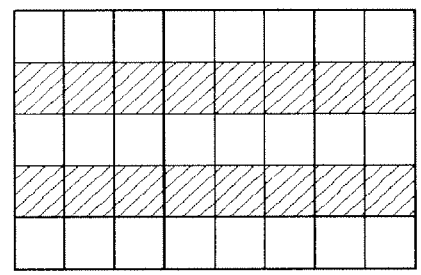
Even position
(b)
FIG. 12
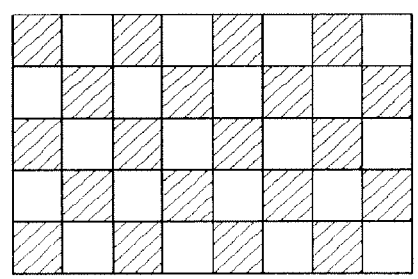
Odd position
(a)
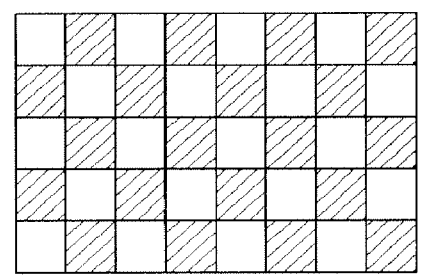
Even position
(b)

FIG. 13

| Syntax | Number of bits | Identifier |
|---|---|---|
| component_descriptor(){ | | |
|    descriptor_tag | 8 | uimsbf |
|    descriptor_length | 8 | uimsbf |
|    reserved_future_use | 4 | bslbf |
|    stream_content | 4 | uimsbf |
|    component_type | 8 | uimsbf |
|    component_tag | 8 | uimsbf |
|    ISO_639_language_code | 24 | bslbf |
|    for (i=0;i<N;i++){ | | |
|      text_char | 8 | uimsbf |
|    } | | |
| } | | |

FIG. 14

| Syntax | Number of bits | Identifier |
|---|---|---|
| linkage_descriptor(){ | | |
|    descriptor_tag | 8 | uimsbf |
|    descriptor_length | 8 | uimsbf |
|    transport_stream_id | 16 | uimsbf |
|    original_network_id | 16 | uimsbf |
|    service_id | 16 | uimsbf |
|    linkage_type | 8 | uimsbf |
|    if (linkage_type == 0x08){ | | |
|      mobile_hand-over_info() | | |
|    } else if (linkage_type == 0x0D){ | | |
|      event_linkage_info() | | |
|    } else if (linkage_type == 0x0E) { | | |
|      extended_event_linkage_info() | | |
|    } | | |
|    for (i=0;i<N;i++){ | | |
|      private_data_byte | 8 | bslbf |
|    } | | |
| } | | |

FIG. 17
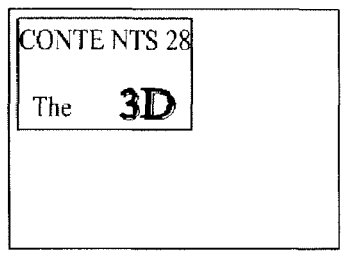
(a)
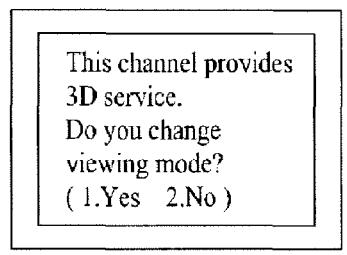
(b)
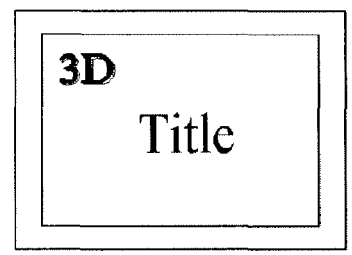
(c)

FIG. 21

| Simple Guide | | | | |
|---|---|---|---|---|
| SBS | Wife Returns [2D]/[3D] | SBS news at 8 [2D] | | SBS sports news [2D] |
| KBS | KBS sports news [2D] | Love in Asia [2D] | | KBS news network [2D] |
| EBS | Magical Princess Seri [3D] | Self-conceit [2D]/[3D] | | EBS news [2D] |
| MBC | MBC news [2D] | Star audition [2D] | High kick through the Roof [2D]/[3D] | |

FIG. 22

| | 12:00 | 13:00 | 14:00 | 15:00 | 16:00 | 17:00 | 18:00 | 19:00 | 20:00 | 21:00 | 22:00 | 23:00 |
|---|---|---|---|---|---|---|---|---|---|---|---|---|
| SBS | | SBS sports news [2D] | | | | | | | | | | |
| | | | | Wife Returns #22 [2D] | | | | | | | | |
| | | | | | | Wife Returns #22 [3D] | | | | | | |
| KBS | | | | | | Taejo Wang Geon #30 [2D] | | | | | | |
| | | KBS news network [2D] | | | | | | | | | | |
| EBS | | Magical Princess Seri [2D] | | | | | | | | | | |
| | | | | Self-conceit [2D] | | | | | | | | |
| MBC | | High kick through the Roof 50회 [2D] | | | | | | | | | | |
| | | High kick through the Roof 50회 [3D] | | | | | | | | | | |

FIG. 25
| KBS | Taejo Wang Geon #30  | |
| --- | --- | --- |
| | Taejo Wang Geon #30  This is 3D version of (Record Date : 2010/03/10) | |
| | Record reservation | Move back | ified/processing
APPARATUS OF PROCESSING AN IMAGE AND A METHOD OF PROCESSING THEREOF This application is a continuation of application Ser. No. 13/097,986 filed on Apr. 29, 2011, which claims priority and benefit from U.S. Provisional Application No. 61/329,571, filed Apr. 30, 2010, each of which is hereby incorporated by reference.

BACKGROUND

Field

The present invention relates to a method and apparatus for processing an image, and more particularly to an image processing method and apparatus for identifying/processing a three dimensional (3D) service contained in a digital broadcast signal, and performing 2D/3D switching.

Background

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

Although broadcast services have been developed from analog broadcasting to digital broadcasting, most of the existing broadcast services are focused upon two dimensional (2D) services for 2D images.

In recent times, 3D services for 3D images (or stereoscopic images) beginning from a specific technical field are a focus of attention, and a great deal of research is focused upon such 3D services that have superior stereoscopic effect and higher sense of reality than 2D services, such that investment and services for such 3D services are rapidly increasing.

In addition, many developers and companies are conducting intensive research into a variety of display devices for providing 3D services.

SUMMARY OF THE INVENTION

An object of the present invention is to provide a method for performing signaling of 3D transmission/reception services in such a manner that a receiver can properly process the received 3D services. Another object of the present invention is to provide a method for allowing a receiver to smoothly process 2D-to-3D or 3D-to-2D service switching.

To achieve the object, one embodiment of the present invention discloses a method of processing an image. A method of transmitting a broadcast signal for a 3-dimensional, 3D, service, the method may include encoding video data for a 3D service into a stream, generating first service information including a first descriptor including first information for specifying that a type of the stream is a video stream and second information for specifying a type of a component included in the video stream is a 3D video component and transmitting a broadcast signal including the encoded stream and the generated service information.

The service information may further include a second descriptor including information for specifying that a type f a service is a 3D service if the service information is a service description table, SDT.

The method may further include generating second service information including a service list descriptor listing the services by a service identifier and a service type.

The service type may allow to signal that a service operates as a 3D service.

The at least one of the first and second service information may comprise a linkage descriptor including first information for specifying the type of linkage, the first information including a value indicating an extended event linkage and the extended event linkage including a value of indicating information for indicating that a target service is a 3D service.

The first descriptor may include values for indicating a video format is any one of a side by side format and a top and bottom format based on the first information and the second information.

The first descriptor may further include values for indicating a frame rate is any one of 25 Hz and 30 Hz based on the first information the second information.

The at least one of the first and second service information may comprise a linkage descriptor including first information for specifying the type of linkage and a private data byte privately defined that a replacement service is a 3D service, and wherein the first information including a value indicating that the replacement service.

In another aspect, one embodiment of the present invention discloses an apparatus of processing an image. An apparatus of receiving a broadcast signal for a 3-dimensional, 3D, service, the apparatus may include a receiving unit configured to receive a broadcast signal including an encoded stream and service information for signaling the 3D service and a decoding unit configured to decode video data for a 3D service into a stream, characterized in that the service information comprises first service information containing a first descriptor including first information for specifying that a type of the stream is a video stream and second information for specifying a type of a component included in the video stream is a 3D video component.

The service information may further include a second descriptor including information for specifying that a type f a service is a 3D service if the service information is a service description table, SDT.

The decoding unit may be further configured to decode second service information including a service list descriptor listing the services by a service identifier and a service type.

The service type may allow to signal that a service operates as a 3D service.

The at least one of the first and second service information may comprise a linkage descriptor including first information for specifying the type of linkage, the first information including a value indicating an extended event linkage and the extended event linkage including a value of indicating information for indicating that a target service is a 3D service.

The first descriptor may include values for indicating a video format is any one of a side by side format and a top and bottom format based on the first information and the second information.

The first descriptor may further include values for indicating a frame rate is any one of 25 Hz and 30 Hz based on the first information the second information.

BRIEF DESCRIPTION OF THE DRAWINGS

Arrangements and embodiments may be described in detail with reference to the following drawings in which like reference numerals refer to like elements and wherein:

FIG. 3 shows a bitstream syntax for a Network Information Table (NIT) section including a service list descriptor according to the present invention;

FIG. 4 shows a bitstream syntax illustrating a service list descriptor according to the present invention;

FIG. 5 shows a bitstream syntax illustrating a Service Description Table (SDT) including a service descriptor according to the present invention;

FIG. 6 shows a bitstream syntax illustrating a service descriptor according to the present invention;

FIGS. 7 and 8 illustrate bitstream syntaxes of examples of a Program Map Table (PMT) section and an Event Information Table (EIT) section, each of which includes a service descriptor;

FIG. 9 illustrates a bitstream syntax illustrating a 3D service descriptor according to the present invention;

FIGS. 10, 11, and 12 illustrate an example of specifying the Table 3.

FIG. 13 illustrates an example of a bitstream syntax of the component descriptor according to the present invention;

FIG. 14 illustrates an example of a bitstream syntax of the linkage descriptor according to the present invention;

FIG. 17 illustrates a UI according to an example embodiment of the present invention;

FIGS. 21 and 22 illustrate exemplary EPG screen images according to the present invention;

FIG. 25 illustrates an example of a detailed UI shown in FIG. 24.

DETAILED DESCRIPTION

Figure 1:
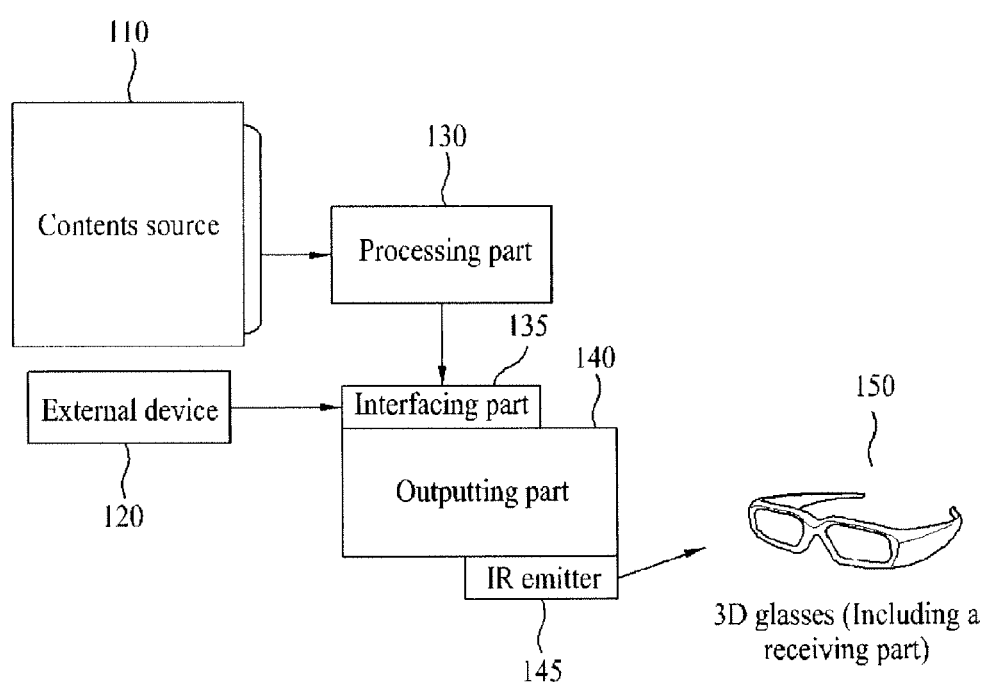
FIG. 1 is a block diagram illustrating an example of an image display apparatus according to the present invention.

Reference will now be made in detail to the preferred embodiments of the present invention with reference to the accompanying drawings. A method and apparatus for processing an image according to embodiments of the present invention will hereinafter be described with reference to the accompanying drawings.

Specifically, embodiments of the present invention provide an image processing method and apparatus to provide a variety of signaling information about identifying/processing of a three dimensional (3D) service, and allow a transmission/reception unit to process the signaling information.

For convenience of description and better understanding of the present invention, the present invention will hereinafter be described using a digital receiver as a 3D service processor. The digital receiver may include a digital television receiver, a receiving set including a set-top box (STB) for processing a 3D service and a display unit for processing the processed 3D image, and all devices (e.g., a personal digital assistant (PDA), a mobile phone, and a smart phone) capable of receiving, processing and providing 3D image data. In addition, the digital receiver may be any one of a 3D dedicated receiver and a 2D/3D combined receiver.

Associated with the present invention, a variety of 3D images may be used in the embodiments of the present invention, for example, a stereoscopic image (also called a stereo image) for utilizing two view points and a multiple view image (also called a multi-view image) for utilizing three or more view points.

The stereoscopic image may indicate one pair of right view image and left view image acquired when a left-side camera and a right-side camera spaced apart from each other by a predetermined distance capture the same target object. The multi-view image may indicate three or more images captured by three or more cameras spaced apart by a predetermined distance or angle.

A variety of transport formats may be used for the stereoscopic image disclosed in the above-mentioned description, for example, a single video stream format, a multiple video stream format (also called a multi-video stream format), etc.

There are a variety of single video stream formats, for example, a side-by-side format, a top/down format, an interlaced format, a frame sequential format, a checker board format, an anaglyph format, etc. And, a variety of multiple video stream formats may be used, for example, a full left/right format, a full left/half right format, a 2D video/depth format, etc.

A stereoscopic image or a multi-view image may be compressed and coded according to a variety of methods including a Moving Picture Experts Group (MPEG) scheme, and transmitted to a reception system.

For example, the stereoscopic image, for example, the side by side format, the top/down format, the interlaced format, the frame sequential format, or the checker board format, may be compressed and coded according to the H.264/Advanced Video Coding (AVC) scheme, and transmitted. In this case, the reception system may decode the stereoscopic image in reverse order of the H.264/AVC coding scheme, such that it can obtain the 3D image.

In addition, one of left view images of the full left/half right format or one of multi-view images may be assigned to an image of a base layer, and the remaining images may be assigned to an image of an enhanced layer. The base layer image may be encoded using the same method as the monoscopic imaging method. In association with the enhanced layer image, only information of a correlation between the base layer image and the enhanced layer image may be encoded and transmitted. As an exemplary compression coding scheme for the base layer image, a Joint Photographic Experts Group (JPEG), an MPEG-1, an MPEG-2, an MPEG-4, or a H.264/AVC scheme may be used. In one embodiment of the present invention, the H.264/Multi-view Video Coding (MVC) scheme may be used as the compression coding scheme for the enhanced layer image. In this case, the stereoscopic image may be assigned to a base layer image and a single enhanced layer image, but the multi view image may be assigned to a single base layer image and a plurality of enhanced layer images. A reference for discriminating between the base layer image and at least one enhanced layer image may be determined according to a position of a camera, or may be determined according to an arrangement format of the camera. Alternatively, the base layer image and the at least one enhanced layer image may also be distinguished from each other on the basis of an arbitrary reference instead of a special reference.

The above-mentioned 3D image display method may be classified into a stereoscopic scheme, a volumetric scheme, a holographic scheme, etc. In addition, a 3D image display device adds depth information to two dimensional (2D) images, such that a user of the 3D image display device can feel a sense of vividness and a sense of reality in a 3D image.

In addition, a method for allowing the user to view the 3D image may be exemplarily classified into a first method for providing the user with glasses and a second method where the user does not wear glasses.

The first method for providing the user with polarized glasses is classified into a passive scheme and an active scheme. The passive scheme displays a left view image and a right view image using a polarization filter in different ways. The active scheme can discriminate between a left view image and a right view image using a liquid crystal shutter. In more detail, the left view image (i.e., a user's left eye) and the right view image (i.e., a user's right eye) are sequentially covered according to the active scheme, such that the left view image and the right view image can be distinguished from each other. That is, the active scheme repeatedly displays screen images created by time division at intervals of a predetermined time period, and allows a user who wears glasses including an electronic shutter synchronized with the predetermined time period to view a 3D image. The active scheme may also be called a scheme of a time split type or a scheme of a shuttered glass type.

Representative examples of the second scheme where the user does not wear glasses are a lenticular scheme and a parallax barrier scheme. In accordance with the lenticular scheme, a lenticular lens plate in which a cylindrical lens array is vertically arranged is installed in front of a video panel. In accordance with the parallax barrier scheme, a barrier layer including periodic slits is installed on the video panel. In order to more easily explain the technical idea of the present invention, a stereoscopic scheme among 3D display schemes will be used as an example, and the active scheme among stereoscopic schemes will be used as an example. However, although the shutter glasses will be used as an exemplary medium of the active scheme, the scope and spirit of the present invention are not limited thereto, and can also be applied to other mediums as necessary without departing from the spirit or scope of the present invention.

The embodiments of the present invention will hereinafter disclose a method for signaling a stereoscopic service using System Information (SI) so as to transmit/receive a stereoscopic video signal over a terrestrial DTV broadcast channel.

FIG. 1 is a block diagram illustrating an example of an image display apparatus according to the present invention.

Referring to FIG. 1, the image display apparatus according to the present invention mainly includes a processing part 130 for processing input sources received from the contents source 110, and an outputting part (i.e., a display unit) 140 for processing audio/video (A/V) data processed by the processing part 130. In this case, the source may exemplarily include a 3D image. The image display apparatus may further include an interfacing unit 135 for processing input sources received from an external device, except for input sources received from the content source 110. The image display apparatus may further include an Infrared Rays (IR) emitter 145 for outputting a synchronization signal (such as synchronization information) so as to allow a user who wears 3D glasses 150 to view a 3D image in such a manner that the user can view sources provided from the outputting unit 140.

In the image display apparatus shown in FIG. 1, the processing part 130 and the display unit 140 are configured in the form of one set acting as a digital receiver, or the processing part 130 may configured in the form of a set-top box (STB) so that the outputting part 140 may operate as a display used as only a output part of signals processed by the STB. Especially, in the latter case, the aforementioned interfacing part 135 may be used to exchange data between the processing part 130 and the outputting part 140.

In the above-mentioned description, the interfacing part 135 may be an interface (I/F) for supporting the High Definition Multimedia Interface (HDMI) specification supporting 3D services.

In addition, the 3D image may be contained in signals or sources received from the contents source 110, such as terrestrial broadcasting, cable broadcasting, satellite broadcasting, an optical disc, Internet Protocol Television (IPTV) broadcasting, or may be directly received from an external device 120 such as a universal serial bus (USB) or a game console. In the latter case in which the 3D image is directly received from the external device 120, signaling information for image display must be defined and provided in the interfacing unit 135 on the basis of the information provided from the external device 120.

In the case of using the external device 120, various formats of 3D images, for example, DivX, component, AV, SCART (Syndicat des Constructeurs d'Appareils Radiorecepteurs et Televiseurs, Radio and Television Receiver Manufacturers' Association) may be input to the image display apparatus. The image display apparatus may include various components for processing the above-mentioned formats.

The 3D glasses 150 may enable a user to view 3D images provided from the outputting part 140 using the receiving part (not shown) that receives a synchronization signal from the IR emitter 145. In this case, the 3D glasses 150 may further include a unit for performing 2D/3D viewing mode switching, and may further include a generator (not shown) for generating individual synchronization information according to the viewing mode switching unit. In addition, the synchronization information generated from the 3D glasses 150 may be generated when a viewing-mode switching request received from the viewing mode switching unit is transmitted to the image display apparatus or when synchronization information is received from the image display apparatus, and the image display apparatus may generate the synchronization information by referring to pre-received synchronization information. In this case, the 3D glasses 150 may further include a storage unit (or a memory) for storing the pre-received synchronization information from the image display apparatus.

Figure 2:
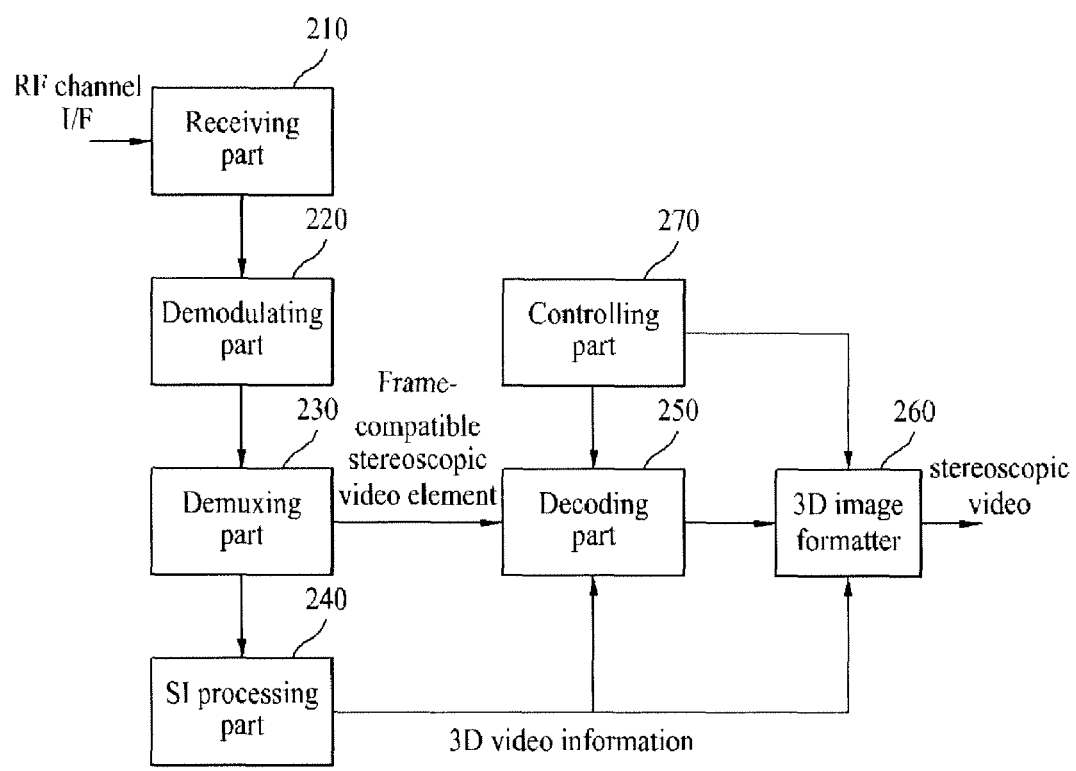
FIG. 2 is a block diagram illustrating another example of the 3D image display apparatus according to the present invention.

FIG. 2 is a block diagram illustrating another example of the 3D image display apparatus according to the present invention. For example, FIG. 2 may be a detailed block diagram of the processing part 130 shown in FIG. 1.

Referring to FIG. 2, the image display apparatus according to the present invention includes a receiving part 210, a demodulating part 220, a demultiplexing part 230, a system information or signaling information (SI) processing part 240, a video decoder 250, a 3D image formatter 260, and a controlling part 270.

Basic operations of the above-mentioned components of the image display apparatus will hereinafter be described, and a detailed description of the following embodiments will be given below with reference to the annexed drawings.

The receiving part 210 receives a digital broadcast signal including 3D image data from the contents source 110 through a radio frequency (RF) channel.

The demodulating part 220 demodulates the digital broadcast signal received from the receiving part 210 using the demodulation scheme mapped to the modulation scheme.

The demultiplexing part 230 may demultiplex audio data, video data and signaling information received from the demodulated digital signal. For this operation, the demultiplexing part 230 performs filtering using a packet identifier (PID) so as to demultiplex the digital broadcast signal. The demultiplexing part 230 outputs the demultiplexed video signal to the latter video decoder 220, and outputs the signaling information to the SI processing part 240. In this case, the signaling information may be any one of system information, for example, Program Specific Information (PSI), Program and System Information Protocol (PSIP), Digital Video Broadcasting-Service Information (DVB-SI), etc.

The SI processing part 240 processes signaling information received from the demultiplexing part 230, and outputs the processed signaling information to the controlling part 270. In this case, the SI processing part 240 may further include a database (DB) for temporarily storing the processed signaling information therein. A detailed description of such signaling information will be given in the following embodiments of the present invention.

The SI processing part 240 determines the presence or absence of signaling information that indicates whether content is a 2D or 3D image. If the presence of the signaling information is decided, the SI processing part 240 reads the signaling information and transmits it to the controlling part 270.

The video decoder 250 receives and decodes the demultiplexed video data. In this case, the decoding may be exemplarily performed on the basis of signaling information processed by the SI processing part 240.

The 3D image formatter 260 performs formatting of 3D image data decoded by the video decoder 260 according to an output format, and outputs the formatted result to the outputting part 140. In this case, the 3D image formatter 260 may be activated only when the decoded image data is 3D image data as necessary. In other words, if the decoded image data is 2D image data, the 3D image formatter 260 may be deactivated. Namely, the 3D image formatter 260 may bypass input image data in such a manner that the input image data is output without any additional processing.

The 3D image formatter 260 performs the required conversion from the input (decoded) video format to native 3D display format. Video processing such as artifact reduction, sharpness, contrast enhancement, de-interlacing, frame rate conversion, and other types of quality enhancement blocks can exist between the video decoder 250 and 3D image formatter 260.

As described above, the present invention enables a DTV receiving apparatus supporting a 3D video processing function to process a 3D video broadcast signal transmitted through a DTV broadcast signal, and output 3D video data on the screen.

For the above-mentioned function, the present invention provides a method for defining one or more descriptors for a 3D service/event supporting reception of a stereoscopic 3D broadcast signal, receiving a stereoscopic broadcast signal using the one or more descriptors, and supporting an stereoscopic display output. The existing terrestrial DTV reception standard is based on 2D video content. Especially, a descriptor for the 3D codec must be defined for the 3D TV service. In addition, the receiver has to properly process such a modified signal such that it can receive and output the 3D broadcast service.

The SI standard related to the existing DVB transmission is limited only to the 2D video service. Therefore, in order to receive a 3DTV signal, specifically, a stereoscopic video signal, through a terrestrial DTV broadcast channel, it is necessary for the existing SI standard to perform signaling of the stereoscopic service. In order to effectively perform signaling of the stereoscopic service, it is necessary to newly design and implement a DTV receiver so as to support 3D broadcast reception.

A service type for indicating a 3D service is defined in a service descriptor of an SDT. A 3D service descriptor for indicating details information about a 3D service and event (program) is defined. In order to indicate a 3D service through an EIT, a method for representing 3D images is defined using a stream_content and a component_type. The receiver processes newly defined 3D signaling so that 2D/3D service switching is smoothly performed.

A variety of signaling methods according to individual levels in association with 3D signaling will hereinafter be described in detail. For example, the term level may indicate a service level in units of a service, content in a service, and a content level in units of an event.

In this case, a descriptor format is mainly used to describe the signaling method of the present invention. However, the scope or spirit of the signaling method is not limited only to the descriptor format, and it should be noted that the concept of a conventional table section field may be extended and a new field may be added as necessary.

FIG. 3 illustrates a bitstream syntax for a Network Information Table (NIT) section including a service list descriptor according to the present invention. FIG. 4 shows a bitstream syntax illustrating a service list descriptor according to the present invention.

The NIT may convey information relating to a physical organization of the multiplexes/TSs carried via a given network, and the characteristics of the network itself. The combination of original_network_id and transport_stream_id allow each TS to be uniquely identified throughout the application area of the present document. Networks are assigned individual network_id values, which serve as unique identification codes for networks. The network_id and the original_network_id can take a same value, or may have to take different values subject to the allocation constraints for original_network_id and network_id.

The receiver may be able to store the NIT information in non-volatile memory in order to minimize the access time when switching between channels (channel hopping). It is also possible to transmit a NIT for other networks in addition to the actual network. Differentiation between the NIT for the actual network and the NIT for other networks is achieved using different table_id values.

Any sections forming part of an NIT shall be transmitted in TS packets with a PID value of 0x0010. Any sections of the NIT which describe the actual network (that is, the network of which the TS containing the NIT is a part) shall have the table_id 0x40 with the same table_id_extension (network_id). The network_id field takes the value assigned to the actual network.

Individual fields of the NIT section will hereinafter be described with reference to FIG. 3.

A table_id field may indicate the NIT section at this table section by a predefined value. A section_syntax_indicator field shall be set to 1. A section_length may be a 12-bit field, the first two bits of which shall be 00. It specifies the number of bytes of the section, starting immediately following the section_length field and including the CRC. The section_length shall not exceed 1021 so that the entire section has a maximum length of 1024 bytes.

A network_id field may serve as a label to identify the delivery system, about which the NIT informs, from any other delivery system. A version_number field may be a version number of the sub_table. The version_number shall be incremented by 1 when a change in the information carried within the sub_table occurs. When it reaches value 31, it wraps around to 0. When the current_next_indicator is set to 1, then the version_number shall be that of the currently applicable sub_table defined by the table_id and network_id. When the current_next_indicator is set to 0, then the version_number shall be that of the next applicable sub_table defined by the table_id and network_id. A current_next_indicator may be a 1-bit indicator, when set to 1 indicates that the sub_table is the currently applicable sub_table. When the bit is set to 0, it indicates that the sub_table sent is not yet applicable and shall be the next sub_table to be valid.

A section_number field may give a number of the section. The section_number of the first section in the sub_table shall be 0x00. The section_number shall be incremented by 1 with each additional section with the same table_id and network—id. A last_section_number field may specify a number of the last section (that is, the section with the highest section_number) of the sub_table of which this section is part.

A network_descriptors_length field may give a total length in bytes of the following network descriptors. A transport_stream_loop_length field may specify a total length in bytes of the TS loops that follow, ending immediately before the first CRC-32 byte. A transport_stream_id field may serve as a label for identification of this TS from any other multiplex within the delivery system. An original_network_id field may give a label identifying the network_id of the originating delivery system. A transport_descriptors_length field may specify a total length in bytes of TS descriptors that follow.

A CRC_32 field may contain a CRC value that gives a zero output of the registers in the decoder after processing the entire section.

Referring to FIG. 4, the service list descriptor is used as an NIT descriptor, such that it is possible to recognize an overall 3D service list.

The service list descriptor shown in FIG. 4 will hereinafter be described in detail.

The service list descriptor provides a means of listing the services by service_id and service type.

A descriptor_tag field may identify a corresponding descriptor by predefined values of descriptor_tag. A descriptor_length field may specify a total number of bytes of the data portion of the descriptor following the byte defining the value of this field.

A service_id field uniquely identifies a service within a TS. The service_id is the same as the program_number in the corresponding program_map_section, except that in the case of service_type=0x04, 0x18 or 0x1B (NVOD reference services) the service_id does not have a corresponding program_number.

A service_type field may specify a type of the service. The assignment of service_type value for a service is more specifically described in Table 1.

As described above, the image display apparatus performs filtering of the NIT sections shown in FIG. 3, parses service_list_descriptor (See FIG. 4) contained in the filtered NIT sections, recognizes service_id in which service_type field is a frame-compatible 3DTV service, and collects/outputs only the list of 3D service (program).

FIG. 5 shows a bitstream syntax illustrating a Service Description Table (SDT) including a service descriptor according to the present invention. FIG. 6 shows a bitstream syntax illustrating a service descriptor according to the present invention.

Each sub_table of the SDT shall describe services that are contained within a particular TS. The services may be part of the actual TS or part of other TSs, these being identified by means of the table_id. Any sections forming part of an SDT shall be transmitted in TS packets with a PID value of 0x0011. Any sections of the SDT which describe the actual TS (that is, the TS containing the SDT) shall have the table_id value 0x42 with the same table_id_extension (transport_stream_id) and with the same original_network_id. Any sections of an SDT which refer to a TS other than the actual TS shall take a table_id value of 0x46.

Individual fields of the SDT section will hereinafter be described with reference to FIG. 5.

A table_id field may indicate the NIT section at this table section by a predefined value. A section_syntax_indicator may be a 1-bit field which shall be set to 1. A section_length may be a 12-bit field, the first two bits of which shall be 00. It specifies the number of bytes of the section, starting immediately following the section_length field and including the CRC. The section_length shall not exceed 1021 so that the entire section has a maximum length of 1024 bytes.

A transport_stream_id may be a 16-bit field which serves as a label for identification of the TS, about which the SDT informs, from any other multiplex within the delivery system. A version_number field may be a version number of the sub_table. The version_number shall be incremented by 1 when a change in the information carried within the sub_table occurs. When it reaches value 31, it wraps around to 0. When the current_next_indicator is set to 1, then the version_number shall be that of the currently applicable sub_table. When the current_next_indicator is set to 0, then the version_number shall be that of the next applicable sub_table. A current_next_indicator may be a 1-bit indicator, when set to 1 indicates that the sub_table is the currently applicable sub_table. When the bit is set to 0, it indicates that the sub_table sent is not yet applicable and shall be the next sub_table to be valid.

A section_number field may give the number of the section. The section_number of the first section in the sub_table shall be 0x00. The section_number shall be incremented by 1 with each additional section with the same table_id, transport_stream_id, and original_network_id. A last_section_number field may specify the number of the last section (that is, the section with the highest section_number) of the sub_table of which this section is part.

An original_network_id field may give the label identifying the network_id of the originating delivery system. A service_id may be a 16-bit field which serves as a label to identify this service from any other service within the TS. The service_id is the same as the program_number in the corresponding program_map_section.

An EIT_schedule_flag may be a 1-bit field which when set to 1 indicates that EIT schedule information for the service is present in the current TS, for information on maximum time interval between occurrences of an EIT schedule sub_table. If the flag is set to 0 then the EIT schedule information for the service should not be present in the TS. An EIT_present_following_flag may be a 1-bit field which when set to 1 indicates that EIT_present_following information for the service is present in the current TS, for information on maximum time interval between occurrences of an EIT present/following sub_table. If the flag is set to 0 then the EIT present/following information for the service should not be present in the TS.

A running_status may be a 3-bit field indicating the status of the service. For an Near Video On Demand (NVOD) reference service the value of the running_status shall be set to 0. A free_CA_mode may be a 1-bit field, when set to 0 indicates that all the component streams of the service are not scrambled. When set to 1 it indicates that access to one or more streams may be controlled by a Conditional Access (CA) system. A descriptors_loop_length field may give a total length in bytes of the following descriptors.

A CRC_32 may be a 32-bit field that contains the CRC value that gives a zero output of the registers in the decoder after processing the entire section.

Referring to FIG. 6, a service descriptor is used as a descriptor of the SDT, and uses the service_type field contained in the service descriptor so as to determine whether a specific service identifier of the SDT indicates a 3D service. In addition, by means of the service descriptor, it may also be possible to determine whether the corresponding 3D service can be decoded and displayed.

The service descriptor shown in FIG. 6 will hereinafter be described in detail.

The service descriptor provides the names of the service provider and the service in text form together with the service_type.

A descriptor_tag field may identify a corresponding descriptor by predefined values of descriptor_tag. A descriptor_length field may specify a total number of bytes of the data portion of the descriptor following the byte defining the value of this field.

A service_type field may specify a type of the service. The assignment of service_type value for a service is described in Table 1.

TABLE 1

| service_type | Description |
| --- | --- |
| 0x00 | reserved for future use |
| 0x01 | digital television service |
| 0x02 | digital radio sound service |
| 0x03 | Teletext service |
| 0x04 | NVOD reference service |
| 0x05 | NVOD time-shifted service |
| 0x06 | mosaic service |
| 0x07 | FM radio service |
| 0x08 | DVB SRM service |
| 0x09 | reserved for future use |
| 0x0A | advanced codec digital radio sound service |
| 0x0B | advanced codec mosaic service |
| 0x0C | data broadcast service |
| 0x0D | reserved for Common Interface Usage |
| 0x0E | RCS Map |
| 0x0F | RCS FLS |
| 0x10 | DVB MHP service |
| 0x11 | MPEG-2 HD digital television service |
| 0x12 to 0x15 | reserved for future use |
| 0x16 | advanced codec SD digital television service |
| 0x17 | advanced codec SD NVOD time-shifted service |
| 0x18 | advanced codec SD NVOD reference service |
| 0x19 | advanced codec HD digital television service |

TABLE 1-continued

| service_type | Description |
| --- | --- |
| 0x1A | advanced codec HD NVOD time-shifted service |
| 0x1B | advanced codec HD NVOD reference service |
| 0x1C | advanced codec frame compatible stereoscopic HD digital television service |
| 0x1D | advanced codec frame compatible stereoscopic HD NVOD time-shifted service |
| 0x1E | advanced codec frame compatible stereoscopic HD NVOD reference service |
| 0x1F to 0x7F | reserved for future use |
| 0x80 to 0xFE | user defined |
| 0xFF | reserved for future use |

For some services the assignment of a service_type from the Table 1 may be obvious, e.g. MPEG-2 HD digital television service. However, the decision is not always so straightforward.

Also, a value of service_type is 0x01 indicating a digital television service. In the generic case this service_type provides no explicit indication to the receiver about the way in which the components of a service have been encoded. Of course, in the case of a specific platform a particular encoding could be implicitly linked to this service_type and so inferred by the receiver. However, any such arrangement is beyond the scope of the present document. This service_type should be used for MPEG-2 SD digital television service. However, it may also be used for services using other encodings, including encodings that have a specific entry elsewhere in table 79, e.g. MPEG-2 HD digital television service.

DVB has deliberately not refined the definition of this service_type from a digital television service to an MPEG-2 SD digital television service due pre-existing use in the context of other (non-MPEG-2 SD) encodings. On the assumption that all receivers will be able to decode and present MPEG-2 SD encoded material, all receivers will present any service assigned this service_type to the viewer for selection on the basis that it may be MPEG-2 SD coded material. However, as described above, this may not be the case and the receiver may not support the actual encoding used. This inability for the receiver to determine whether or not is will actually be able to decode and present a service assigned this service_type means that the service provider needs to allocate it with care depending on the viewer experience it wishes to achieve.

As an example, consider a platform where some services are based on MPEG-2 SD encoding and others are based on MPEG-2 HD encoding, both of which are delivered to a mixed population of MPEG-2 SD-only and MPEG-2 SD/HD receivers. For a service based on MPEG-2 SD encoding the assignment of service_type is obvious: 0x01 (digital television service). However, for a service based on MPEG-2 HD encoding the assignment of service_type depends on whether the service provider wants the service to be included in any service list presented to viewers of MPEG-2 SD-only receivers, even though they will not actually be able to view the service if selected. If this is the desired viewer experience then the service should be allocated service_type 0x01 (digital television service). If, however, the desired viewer experience is only to list services that the viewer of an MPEG-2 SD-only receiver will actually be able to view then the service should be allocated service_type 0x11 (MPEG-2 HD digital television service). This service_type may also be allocated to a service that contains both an MPEG-2 SD encoding and an alternative encoding (e.g. an MPEG-4 HD) of the same material. This is reasonable on the assumption that all receivers will be able to decode and present MPEG-2 SD encoded material, hence the viewer will at least be presented with the MPEG-2 SD coded form. However, depending on the capabilities of the receiver in use the viewer may be presented with the alternative, typically superior, coded form. The components used for the different encodings can be discriminated between at the point of decode by the assigned value(s) for stream_type in PSI and/or use of the component_descriptor in SI.

Also, a value of service_type is various indicating an advanced codec. The advanced codec service_types have been allocated so as to be able to indicate that a service has been encoded using something other than MPEG-2. More specifically, assignment of one of these service_types implies that the receiver must support a codec other than MPEG-2 to be able to decode and present the service. On this basis it is recommended that MPEG-2 SD-only receivers should not present any service assigned one of these service_types to the viewer for selection. The assignment of one of these service_types provides a generic indication of the use of some advanced codec but not specifically which one. As such, on its own, it does not fully allow a receiver to determine that it is able to decode and present a service assigned one of these service_types. Of course, in the case of a specific platform a particular encoding could be implicitly linked to one of this service_type and so inferred by the receiver. However, any such arrangement is beyond the scope of the present document. Where a service is assigned one of the advanced codec service_types the component_descriptor should be used in SI to indicate the particular advanced codec used. This allows a receiver to unambiguously determine whether or not it will be able to decode and present the service and handle as appropriate.

Also, the value of service_type is various indicating an advanced codec frame compatible stereoscopic HD. The frame compatible stereoscopic HD values allow a broadcaster to signal that a service operates (primarily) as a stereoscopic service. The use of these values requires careful consideration of the consequences for legacy receiver populations, which as a result may ignore these services. Therefore, a broadcaster may instead choose to signal a frame compatible stereoscopic service as a normal HD service, and use alternative signaling to indicate that the service (or event) is in a frame compatible stereoscopic format. A service_provider_name_length field may specify the number of bytes that follow the service_provider_name_length field for describing characters of the name of the service provider. A Char is an 8-bit field. A string of char fields specify the name of the service provider or service. Text information is coded using the character sets and methods. A service_name_length field may specify the number of bytes that follow the service_name_length field for describing characters of the name of the service.

FIGS. 7 and 8 illustrate bitstream syntaxes of examples of a Program Map Table (PMT) section and an Event Information Table (EIT) section, each of which includes a service descriptor. FIG. 9 illustrates a bitstream syntax illustrating a 3D service descriptor according to the present invention.

The PMT may provide mappings between program numbers and program elements that comprise them. A single instance of such a mapping is referred to as a program definition. The PMT is the complete collection of all program definitions for a TS. This table shall be transmitted in packets, the PID values of which are selected by the encoder. Sections are identified by the program_number field.

Individual fields of the PMT section will hereinafter be described with reference to FIG. 7.

A table_id field may indicate the PMT section at this table section by a predefined value. A section_syntax_indicator field shall be set to 1. A section_length field shall be a first two bits of which shall be 00 and a remaining 10 bits specifying the number of bytes of the section starting immediately following the section_length field, and including the CRC. The value in this field shall not exceed 1021 (0x3FD).

A program_number field may specify a program to which the program_map_PID is applicable. One program definition shall be carried within only one TS_program_map_section. This implies that a program definition is never longer than 1016 (0x3F8). The program_number may be used as a designation for a broadcast channel, for example. By describing the different program elements belonging to a program, data from different sources (e.g., sequential events) can be concatenated together to form a continuous set of streams using a program_number. A version_number field may be a version number of the TS_program_map_section. The version number shall be incremented by 1 modulo 32 when a change in the information carried within the section occurs. Version number refers to the definition of a single program, and therefore to a single section. When the current_next_indicator is set to 1, then the version_number shall be that of the currently applicable TS_program_map_section. When the current_next_indicator is set to 0, then the version_number shall be that of the next applicable TS_program_map_section.

A current_next_indicator may be a 1-bit field, which when set to 1 indicates that the TS_program_map_section sent is currently applicable. When the bit is set to 0, it indicates that the TS_program_map_section sent is not yet applicable and shall be the next TS_program_map_section to become valid.

A section_number field shall be 0x00. A last_section_number field shall be 0x00. A PCR_PID field may indicate a PID of the TS packets which shall contain the PCR fields valid for the program specified by program_number. If no PCR is associated with a program definition for private streams, then this field shall take the value of 0x1FFF. A program_info_length may be a 12-bit field, the first two bits of which shall be 00 and a remaining 10 bits specifying a number of bytes of the descriptors immediately following the program_info_length field.

A stream_type may be an 8-bit field specifying a type of program element carried within the packets with the PID whose value is specified by the elementary_PID. A auxiliary stream is available for data types defined by this Specification, other than audio, video, and DSM-CC, such as Program Stream Directory and Program Stream Map. An elementary_PID may be a 13-bit field specifying the PID of the TS packets which carry the associated program element. An ES_info_length may be a 12-bit field, the first two bits of which shall be 00 and a remaining 10 bits specifying a number of bytes of the descriptors of the associated program element immediately following the ES_info_length field.

A CRC_32 field may contain the CRC value that gives a zero output of the registers in the decoder after processing the entire TS program map section.

The EIT may provide information in chronological order regarding events contained within each service. All EIT sub-tables for the actual TS shall have a same transport_stream_id and original_network_id values. The present/following table shall contain only information pertaining to the present event and the chronologically following event carried by a given service on either the actual TS or another TS, except in the case of a NVOD reference service where it may have more than two event descriptions. The event schedule tables for either the actual TS or other TSs, contain a list of events, in the form of a schedule, namely, including events taking place at some time beyond the next event. The event information shall be chronologically ordered. Any sections forming part of an EIT shall be transmitted in TS packets with a PID value of 0x0012.

Individual fields of the EIT section will hereinafter be described with reference to FIG. 8.

A table_id field may indicate the EIT section at this table section by a predefined value. A section_syntax_indicator field shall be set to 1. A section_length field may specify a number of bytes of the section, starting immediately following the section_length field and including the CRC. The section_length shall not exceed 4093 so that the entire section has a maximum length of 4096 bytes.

A service_id field may serve as a label to identify this service from any other service within a TS. The service_id is the same as the program_number in the corresponding program_map_section. A version_number field is a version number of the sub_table. The version_number shall be incremented by 1 when a change in the information carried within the sub_table occurs. When it reaches value 31, it wraps around to 0. When the current_next_indicator is set to 1, then the version_number shall be that of the currently applicable sub_table. When the current_next_indicator is set to 0, then the version_number shall be that of the next applicable sub_table.

A current_next_indicator may be a 1-bit indicator, when set to 1 indicates that the sub_table is the currently applicable sub_table. When the bit is set to 0, it indicates that the sub_table sent is not yet applicable and shall be the next sub_table to be valid. A section_number field may give a number of the section. The section_number of the first section in the sub_table shall be 0x00. The section_number shall be incremented by 1 with each additional section with the same table_id, service_id, transport_stream_id, and original_network_id. In this case, the sub_table may be structured as a number of segments. Within each segment the section_number shall increment by 1 with each additional section, but a gap in numbering is permitted between the last section of a segment and the first section of the adjacent segment. A last_section_number field may specify a number of the last section (that is, the section with the highest section_number) of the sub_table of which this section is part.

A transport_stream_id field may serve as a label for identification of the TS, about which the EIT informs, from any other multiplex within the delivery system. An original_network_id field may give the label identifying the network_id of the originating delivery system. A segment_last_section_number field may specify a number of the last section of this segment of the sub_table. For sub_tables which are not segmented, this field shall be set to the same value as the last_section_number field. A last_table_id field may identify a last table_id used. An event_id field may contain an identification number of the described event (uniquely allocated within a service definition).

A start_time field may contain a start time of the event in Universal Time, Co-ordinated (UTC) and Modified Julian Date (MJD). This field is coded as 16 bits giving the 16 LSBs of MJD followed by 24 bits coded as 6 digits in 4-bit Binary Coded Decimal (BCD). If the start time is undefined (e.g. for an event in a NVOD reference service) all bits of the field are set to 1. A Duration field may contain a duration of the event in hours, minutes, and seconds.

A running_status field may indicate a status of the event. For an NVOD reference event the value of the running_status shall be set to 0. A free_CA_mode may be a 1-bit field, when set to 0 indicates that all the component streams of the event are not scrambled. When set to 1 it indicates that access to one or more streams is controlled by a CA system. A descriptors_loop_length field may give a total length in bytes of the following descriptors.

A CRC_32 field may contain a CRC value that gives a zero output of the registers in the decoder after processing the entire private section.

Referring to FIG. 9, the 3D service descriptor according to the present invention may be contained in the SDT of FIG. 5 and the PMT of the FIG. 7. For example, the image display apparatus can recognize the corresponding service or program is a 3D service when the 3D service descriptor is contained in a specific service or program contained in the SDT or PMT. In addition, the image display apparatus can recognize 3D video format information and the like using information contained in the 3D service descriptor. In addition, it is determined whether there is a 3D service for a predetermined event using the 3D service descriptor contained in the EIT.

The 3D service descriptor may include details information of a 3D service and program, and may be located in the PMT or SDT (where the 3D service descriptor may be located in the EIT such that it may indicate 3D information for the announced program/event).

The 3D service descriptor may be used, when the service_type is a frame-compatible 3DTV or when stream_content and component_type for the event is the frame-compatible 3D, and may include the following fields.

A descriptor_tag field may identify a corresponding descriptor by predefined values of descriptor_tag. A descriptor_length field may specify a total number of bytes of the data portion of the descriptor following the byte defining the value of this field.

A 3D_structure field may indicate a video format of the 3D program. For example, the 3D_structure field may be represented by the following Table 2.

TABLE 2

| 3D_structure | Meaning |
| --- | --- |
| 0000 | Full resolution Left &Right |
| 0001 | Field alternative |
| 0010 | Line alternative |
| 0011 | Reserved |
| 0100 | L + depth |
| 0101 | Reserved |
| 0110 | Top and bottom |
| 0111 | Frame sequential |
| 1000 | Side-by-side |
| 1001~1111 | Reserved |

Referring to Table 2, if the 3D_structure field value is set to 0000, this means a Full Resolution Left & Right format. If the 3D_structure field value is set to 0001, this means a field alternative format. If the 3D_structure field value is set to 0010, this means a line alternative scheme. If the 3D_structure field value is set to 0100, this means a left image plus depth (L+depth) scheme. If the 3D_structure field value is set to 0110, this means a Top-and-Bottom (TaB) scheme. If the 3D_structure field value is set to 0111, this means a frame sequential scheme. If the 3D_structure field value is set to 1000, this means a side-by-side (SbS) scheme. However, fields and meaning shown in Table 2 are disclosed only for illustrative purposes, and the scope and spirit of the present invention are not limited thereto and may be applied to other examples as necessary.

If the 3D_metadata_location_flag field is set to 01, 3D_metadata_type, 3D_metadata_length, and 3D_metadata fields may be additionally present in the 3D service descriptor. If the 3D_metadata_location_flag field is set to 00, the corresponding data is not transmitted. If the 3D_metadata_location_flag field is set to 10, 3D_metadata_type, 3D_metadata_length, 3D_metadata fields and the like may be transmitted from a video region.

The 3D_sampling field indicates information regarding the frame-compatible format of the 3D program. For example, the 3D_sampling field may be represented by the following Table 3.

TABLE 3

| 3D_sampling | | Meaning |
|---|---|---|
| 0000 | | Odd/Left,Odd/Right |
| 0001 | Horizontal/vertical sub-sampling | Odd/Left, Even/Right |
| 0010 | | Even/Left, Odd/Right |
| 0011 | | Even/Left,Even/Right |
| 0100 | | Odd/Left,Odd/Right |
| 0101 | | Odd/Left, Even/Right |
| 0110 | Quincunx matrix | Even/Left, Odd/Right |
| 0111 | | Even/Left,Even/Right |
| 1000 | | Averaging |
| 1001-1111 | | Reserved |

In addition, fields shown in Table 3 will hereinafter be described with reference to FIGS. 10 to 12. In this case, FIGS. 10(*a*), 11(*a*), and 12(*a*) show odd positions, and FIGS. 10(*b*), 11(*b*), and 12(*b*) show even positions.

Referring to FIGS. 10 and 11, if the 3D_sampling field is set to 0000 to 0011, this means sub-sampling. In more detail, if the 3D_sampling field is set to 0000, this means sub-sampling, especially, means odd Left (L) and odd Right (R). If the 3D_sampling field is set to 0001, this means sub-sampling, especially, means odd Left (L) and even Right (R). If the 3D_sampling field is set to 0010, this means sub-sampling, especially, means even Left (L) and odd Right (R). If the 3D_sampling field is set to 0011, this means sub-sampling, especially, means even Left (L) and even Right (R).

Referring to FIG. 12, if the 3D_sampling field is set to 0100 to 0111, this means a quincunx matrix. For example, if the 3D_sampling field is set to 0100, this means a quincunx matrix, especially, an odd Left (L) means odd Right (R). If the 3D_sampling field is set to 0101, this means a quincunx matrix, especially, means odd Left (L) and even Right (R). If the 3D_sampling field is set to 0110, this means a quincunx matrix, especially, means even Left (L) and odd Right (R). If the 3D_sampling field is set to 0111, this means a quincunx matrix, especially, means even Left (L) and even Right (R). Although the above-mentioned exemplarily discloses that the 3D video format is SbS, it should be noted that TaB may be defined as in the SbS, and may be additionally defined in the above-mentioned examples.

The 3D_orientation field indicates a pixel arrangement format of left- and right-view data contained in a 3D program, and may be defined as shown in Table 4.

TABLE 4

| 3D_orientation | Meaning |
|---|---|
| 00 | Left-Normal, Right-Normal |
| 01 | Left-Normal, Right-Inverted |
| 10 | Left-Inverted, Right-Normal |
| 11 | Left-Inverted, Right-Inverted |

Referring to FIG. 4, if the 3D_orientation field is set to 00, this means a normal case in which a left picture and a right picture are inverted in 3D video orientation. If the 3D_orientation field is set to 01, this means that only the right picture is inverted in the 3D video orientation. If the 3D_orientation field is set to 10, this means that only the left picture is inverted in the 3D video orientation. If the 3D_orientation field is set to 11, this means that left and right pictures are inverted in the 3D video orientation.

The 3D_metadata_type field is a valid field when the 3D_metadata_exist_flag is set to 1, so that 3D_metadata_length and 3D_metadata are defined as shown in Table 5.

TABLE 5

| 3D_metadata_type | 3D_metadata_length | 3D_metadata | Meaning |
|---|---|---|---|
| 000 | 4 | 3D_metadata [0] | parallax_zero |
| | | 3D_metadata [1] | parallax_scale |
| | | 3D_metadata [2] | Dref |
| | | 3D_metadata [3] | Wref |
| 001 | 4 | 3D_metadata [0] | xB |
| | | 3D_metadata [1] | Zref |
| | | 3D_metadata [2] | Dref |
| | | 3D_metadata [3] | Wref |

If the 3D_metadata_type field is set to 000, the 3D_metadata_length may be set to 4, and 3D_metadata may be at least one of four values or all the four values. As examples of such four values, 3D_metadata[0] may indicate parallax_zero, 3D_metadata[1] may indicate parallax_scale, 3D_metadata[2] may indicate Dref, and 3D_metadata[3] may indicate Wref. On the other hand, if the 3D_metadata_type field is set to 001, 3D_metadata_length is also set to 4, and 3D_metadata may be at least one of four values or all the four values. As examples of such four values, 3D_metadata[0] may indicate xB, 3D_metadata[1] may indicate Zref, 3D_metadata[2] may indicate Dref, and 3D_metadata[3] may indicate Wref.

In association with the above-mentioned description, parameters shown in Table 5 are environmental values intended in the 3D content manufacturing process, and may enable the receiver to implement the stereoscopic effect intended by a manufacturer using the environmental values. Individual parameters are data for correctly interpreting each parallax on the condition that a parallax map is transmitted as in a depth map. In other words, upon receiving a parallax map, a new viewpoint image is formed using a reference value for each value and parallax values converted in consideration of the existing viewing environment.

The Dref parameter may be a distance (cm) from a viewer and a screen, wherein the distance (cm) may be defined as a reference in the 3D content manufacturing process. The Wref parameter is a horizontal size (cm) of a screen defined as a reference in the 3D content manufacturing process. The Zref parameter is a depth value (cm) defined as a reference in the 3D content manufacturing process. The xB parameter is a distance (reference value=65 mn) between the user's eyes.

Reference parallax Pref may be calculated using Equation 1 (It is assumed that each value of the parallax map is represented by N bits).

$$P\mathrm{ref}=((m\ \mathrm{parallax\_zero})/2^N)*(\mathrm{parallax\_scale}/256)*(W\mathrm{ref}/8) \quad [\text{Equation 1}]$$

Parallax on the actual screen is calculated as shown in Equation 2 (See ISO23002-3).

$$p = x_B\left(1 - \frac{D}{D - \left(\frac{D_{ref}}{W_{ref}} * \frac{W \cdot p_{ref}}{p_{ref} - x_B}\right)}\right) \approx -p_{ref} * \frac{dref}{wref} * \frac{W}{D} * \frac{x_B}{p_{ref} - x_B} \quad [\text{Equation 2}]$$

In Equation 2, D is a distance between a viewer and a receiver, and W is a horizontal size of the screen. If 3D_metadata_type is set to 000, the xB parameter is not transmitted, and it is assumed that the xB parameter is 65 mm.

FIG. 13 shows an example of a bitstream syntax of the component descriptor according to the present invention.

In this case, the component descriptor of FIG. 13 is defined as an SDT descriptor, so that it can determine whether the corresponding service is a 3D service. In addition, the component descriptor of FIG. 13 is defined as a descriptor of the EIT so that it is determined whether the corresponding event is a 3D event.

The component descriptor may identify a type of component stream and may be used to provide a text description of the elementary stream.

Individual fields of the component descriptor will hereinafter be described with reference to FIG. 13.

A descriptor_tag field may identify a corresponding descriptor by predefined values of descriptor_tag. A descriptor_length field may specify a total number of bytes of the data portion of the descriptor following the byte defining the value of this field.

A stream_content field may specify a type (video, audio, or EBU-data) of stream. The coding of this field is specified in table 26. A component_type field may specify a type of the video, audio or EBU-data component.

A component_tag field may have a same value as the component_tag field in the stream identifier descriptor (if present in the PSI program map section) for the component stream.

An ISO_639_language_code field may identify a language of the component (in the case of audio or EBU-data) and of the text description which may be contained in this descriptor. The ISO_639_language_code may contain a 3-character code as specified by ISO 639-2. Each character is coded into 8 bits and inserted in order into the 24-bit field.

A text_char field may have a string of specifying a text description of the component stream. Text information is coded using the character sets and methods.

Specifically, the stream_content field and the component_type field contained in the component descriptor are defined as shown in Table 6, such that the image display apparatus can identify a 3D service or 3D event of the corresponding service or event through the component descriptor.

TABLE 6

| Stream_content | Component_type | Description |
| --- | --- | --- |
| 0x01 | 0x11 | MPEG-2 video, Frame-compatible 3D video, 25 Hz |
| 0x01 | 0x12 | MPEG-2 video, Frame-compatible 3D video, 30 Hz |
| 0x03 | 0x15 | DVB subtitles (normal) for display on 3D monitor |
| 0x03 | 0x25 | DVB subtitles (for the hard of hearing) for display on 3D monitor |
| 0x05 | 0x11 | AVC/H.264 video, Frame-compatible 3D video, 25 Hz |
| 0x05 | 0x12 | AVC/H.264 video, Frame-compatible 3D video, 30 Hz |

Referring to Table 6, if the stream_content is set to 0x01, this means an MPEG-2 video stream. In this case, if the component_type is set to 0x11, this means a frame-compatible 3D video stream of 25 Hz. If the component_type is set to 0x12, this means a frame-compatible 3D video stream of 30 Hz.

In addition, if the stream_content is set to 0x05, this means H.264/AVC standard definition video. If the component_type is set to 0x11, this means a frame-compatible 3D video of 25 Hz. If the component_type is setot 0x12, this means a frame-compatible 3D video of 30 Hz.

In addition, if the stream_content is set to 0x03 and the component_type is set to 0x15, this means DVB subtitles (normal) for display on 3D monitor. If the stream_content is set to 0x03 and the component_type is set to 0x25, this means DVB subtitles (for the hard of hearing) for display on 3D monitor.

In this case, the comparison result between translation subtitling and hard-of-hearing is as follows.

The translation subtitles are usually white and placed in the centre of the screen. Hearing audience will be able to identify speakers and sound effects, so only dialogue is needed in subtitles. The hard-of-hearing may have to recognise extra needs of the deaf/hard-of-hearing audience. In conclusion, the normal is mainly based on a dialogue, and the hard-of-hearing may include overall situation information indicating who is talking about hard-of-hearing persons.

Therefore, the image display apparatus parses the component descriptor of FIG. 13, extracts a value of the stream_content field and a value of the component_type field, identifies whether the corresponding service is a 3D service, and determines whether the corresponding service or event is decoded and output.

Figure 15:
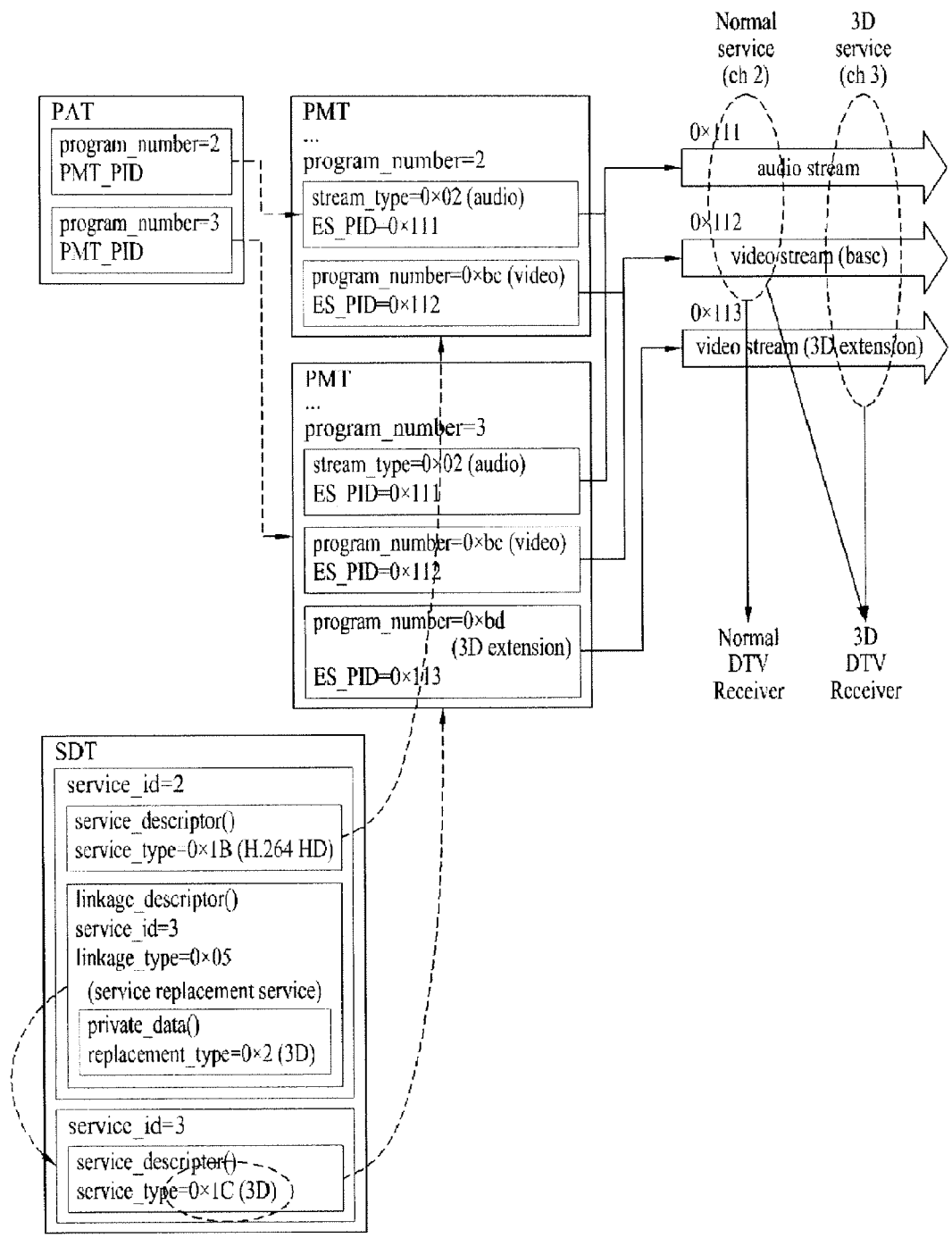
FIG. 15 illustrates a 3D service signaling method using the linkage descriptor according to the present invention.

FIG. 14 shows an example of a bitstream syntax of a linkage descriptor according to the present invention. FIG. 15 shows a 3D service signaling method using the linkage descriptor according to the present invention.

For example, the linkage descriptor may be contained in the SDT of FIG. 5 or EIT of FIG. 8. The image display apparatus can recognize a 3D service or event corresponding to a current viewing 2D service_id or a specific 2D event_id to be broadcast in future.

Referring to FIG. 14, a linkage_type contained in the linkage_descriptor is set to 0x05 (service replacement service), and a replacement type may be set to 3D in the private_data_byte field.

In another example, when the linkage descriptor is transmitted to the EIT, a linkage_type is set to 0x0D (event linkage), and the presence or absence of the corresponding 3D service can be recognized using a 3D service descriptor or a component descriptor for the target_event_id field.

In another example, the linkage_type may be set to a new value 0x0E, and the corresponding description may be set to 3D service.

In another example, the linkage_type is set to 0x05 (service replacement service). Here, as to the service_type for a target service, it is determined whether a 3D service is performed by directly parsing the SDT, EIT, etc. used in the corresponding service.

The linkage descriptor identifies a service that can be presented if the consumer requests for additional information related to a specific entity described by the SI system. The location of the linkage descriptor in the syntax indicates the entity for which additional information is available. For example a linkage descriptor located within the NIT shall point to a service providing additional information on the network, a linkage descriptor in the BAT shall provide a link to a service informing about the bouquet, etc.

A CA replacement service can be identified using the linkage descriptor. This service may be selected automatically by the receiver if the CA denies access to the specific entity described by the SI system. A service replacement service can also be identified using the linkage_descriptor. This replacement service may be selected automatically by the IRD when the running status of the current service is set to not_running.

Individual fields of the linkage descriptor will hereinafter be described with reference to FIG. 14.

A transport_stream_id field may identify the TS containing the information service indicated.

An original_network_id field may give a label identifying the network_id of the originating delivery system of the information service indicated.

A service_id field uniquely identifies an information service within a TS. The service_id is the same as the program_number in the corresponding program_map_section. If the linkage_type field has the value 0x04, then the service_id field is not relevant, and shall be set to 0x0000.

A linkage_type field may specify a type of linkage e.g. to information (see table 7).

TABLE 7

| Linkage type Description | |
|---|---|
| 0x00 | reserved for future use |
| 0x01 | information service |
| 0x02 | EPG service |
| 0x03 | CA replacement service |
| 0x04 | TS containing complete Network/Bouquet SI |
| 0x05 | service replacement service |
| 0x06 | data broadcast service |
| 0x07 | RCS Map |
| 0x08 | mobile hand-over |
| 0x09 | System Software Update Service |
| 0x0A | TS containing SSU BAT or NIT |
| 0x0B | IP/MAC Notification Service |
| 0x0C | TS containing INT BAT or NIT |
| 0x0D | event linkage |
| 0x0E | extended event linkage |
| 0x0F to 0x7F | reserved for future use |
| 0x80 to 0xFE | user defined |
| 0xFF | reserved for future use |

Herein, the linkage_type with value 0x0D or 0x0E is only valid when the descriptor is carried in the EIT.

A mobile_hand-over_info( ) field shall be coded according to a predefined method. An event_linkage_info( ) field shall be coded according to a predefined method. An extended_event_linkage_info( ) field shall be coded according to a predefined method. A private_data_byte is an 8-bit field, the value of which is privately defined.

Referring to FIG. 15, the PAT defines the program_number value and a PMT_PID of the corresponding program. The image display device extracts a PMT from the PAT, and parses the extracted PMT.

Here, when using a 2D service, the PMT may indicate the stream_type and program_number of the corresponding program. For example, if the stream_type is set to 0x02, the corresponding stream is an audio stream. In this case, the PID of the audio ES may indicate 0x111. In addition, if the program_number is 0xbc, this means that the corresponding stream is a video stream. In this case, the PID of the video ES may indicate 0x112.

However, when using the 3D service, the PMT may further define one program_number other than stream_type and program_number. For example, if it is assumed that the program_number is 0xbd, this means 3D extension, and the ES PID may indicate 0x113. Therefore, the image display apparatus for supporting the 3D service extracts and parses one stream_type value and two program_number values, such that it can identify and process the 3D service.

In this case, the SDT is mapped to the program_number of the PMT through the service_id, such that the corresponding service can be signaled.

If the SDT service_type is set to 2, the service_type of 2 is mapped to the program_number of the PMT, and the service_type of the service descriptor contained in the SDT is set to 0x1B. (H.264 HD) such that the 2D service can be signaled. If the service_id is set to 3 and the linkage_type is set to 0x05, this means a service replacement service, and the 3D is indicated through private_data( ) and replacement_type (0x02), such that the presence and processing of a 3D service corresponding to the service_id 2 can be signaled. Likewise, even in the case where the service_id is set to 3, the service_type of the service_descriptor is defined as 0x1C such that the 3D service can be immediately signaled.

In association with the above-mentioned description, the replacement_type defines the relationship between services as shown in Table 8, such that a HD multicast or a 3D service can be identified on the basis of the defined relationship.

TABLE 8

| Replacement_type | Type of replacement service |
|---|---|
| 0x00 | HD simulcast |
| 0x01 | SVC |
| 0x02 | 3D stereoscopic |
| 0x03-0xff | Reserved for use |

Figure 16:
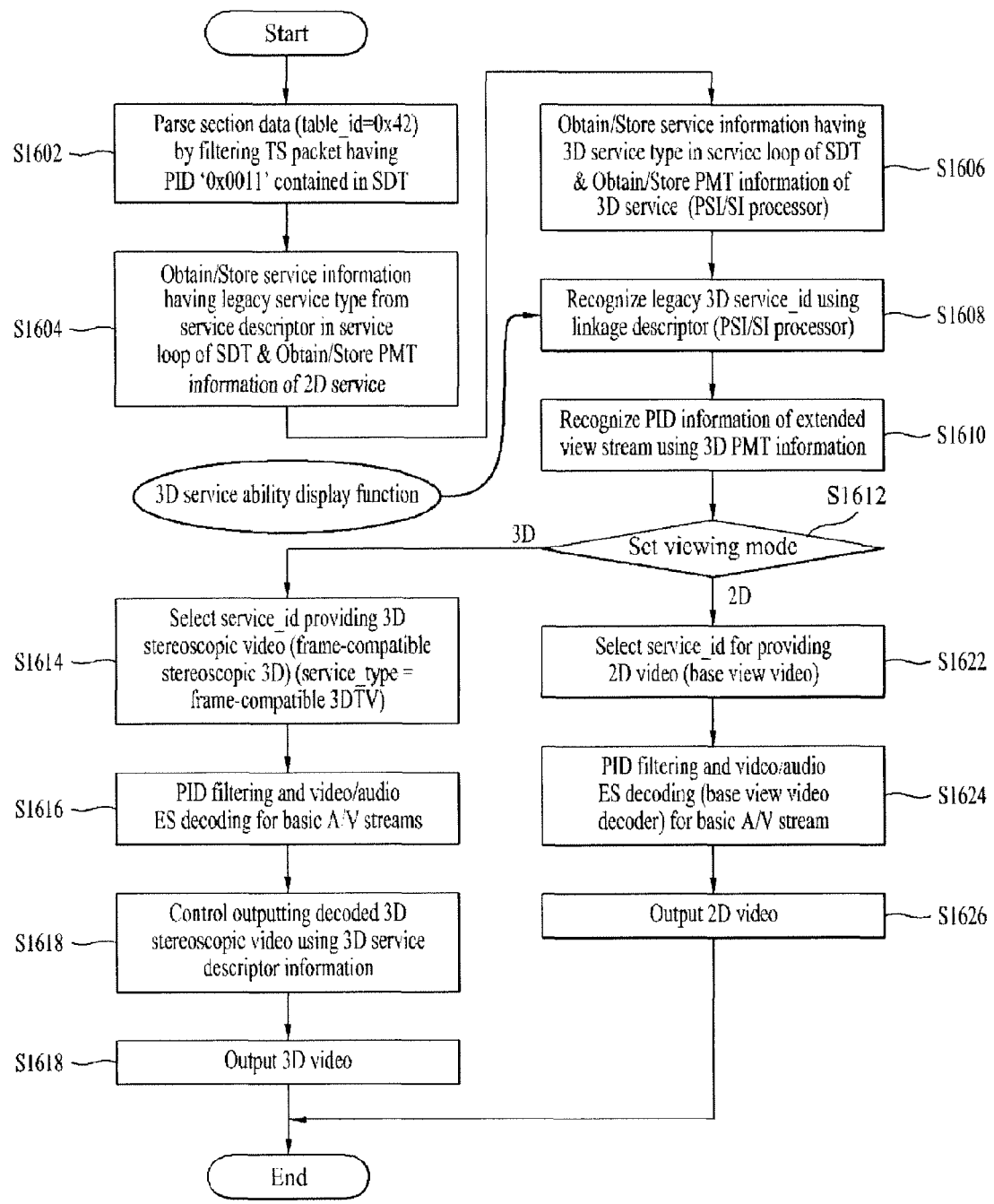
FIG. 16 is a flowchart illustrating a method for outputting a stereoscopic video signal using 3D signaling information according to the present invention.

FIG. 16 is a flowchart illustrating a method for outputting a stereoscopic video signal using 3D signaling information according to the present invention.

Referring to FIG. 16, the demultiplexing part 230 performs filtering and parsing of SDT sections upon receiving a digital broadcast signal. As described above, the demultiplexing part performs filtering of SDT sections through PID filtering. For example, the PID may be set to 0x0011, and a TS packet having the corresponding PID is filtered, such that section data of table_id=0x42 can be parsed (Step S1602).

The SI processing part 240 may obtain information of a service having a legacy service type from the service descriptor contained in the service loop contained in the SDT, and store the obtained information (Step S1604).

The SI processing part 240 may obtain information of a service having a 3D service type from the service loop of the parsed SDT, and store the obtained information. That is, the SI processing part may obtain and store PMT information regarding the 3D service (Step S1606).

The SI processing part 240 parses a linkage descriptor from the signaling information, and recognizes legacy 3D service ID information using the parsed linkage descriptor information (Step S1608).

The SI processing part 240 may recognize PID information of the extended view stream using the 3D PMT information (Step S1610).

The digital receiver receives information of a viewing mode setup (Step S1612).

Two methods can be used according to individual viewing modes. First, the case of a 3D viewing mode setup will hereinafter be described The digital receiver may select service_id for providing a 3D stereoscopic video (frame-compatible stereoscopic 3D) in step S1614. In this case, the service_type of the service_id may be a frame-compatible 3DTV as an example (Step S1616).

The controller 270 may output a 3D stereoscopic video decoded by the 3D image formatter using the 3D service descriptor (Step S1618).

The 3D video being output through the 3D image formatter 260 is displayed on the screen through the output unit (Step S1620).

Next, the case of a 2D viewing mode setup will hereinafter be described in detail.

The digital receiver may select service_id for providing a 2D video (base view video) (Step S1622). For example, the channel having the service_id may be a legacy channel.

The controller may control the demultiplexing part and the decoder to perform PID filtering and video/audio ES decoding (Base View Video Decoder) of the basic A/V streams (Step S1624).

The controller outputs the decoded 2D video through the output unit (Step S1626).

FIG. 17 illustrates a UI according to an example embodiment of the present invention. Other embodiments and configurations are also within the scope of the present invention.

FIGS. 17(*a*), 17(*b*) and 17(*c*) show User Interfaces (UIs) or On Screen Display (OSD) screens configured to indicate that a channel searched during a channel search may provide 3D contents, distinguishable from a channel that provides 2D contents. At this time, the digital receiver can recognize whether the corresponding channel provides 3D service. As an example, the digital receiver can determine that the corresponding channel provides 3D service based on at least one of the service list descriptor of FIG. 4, the service descriptor of FIG. 6, the 3D service descriptor of FIG. 9 and the component descriptor of FIG. 13 in advance.

Since the viewer does not get knowledge of 3D channels during a channel search unlike the foregoing cases, the UIs or OSD screens may be configured as shown in FIGS. 17(*a*), 17(*b*) and 17(*c*) to indicate the 3D channels.

In FIG. 17(*a*), a 3D indicator 1715 may be displayed on a channel banner 1110 appearing during a channel search in the UI.

In FIG. 17(*b*), an OSD screen 1720 may indicate that an accessed channel provides 3D contents.

In FIG. 17(*c*), an OSD screen 1730 may display a 3D indicator 1735 over the title of a 3D content to indicate that an accessed channel provides the 3D content.

In the examples of FIGS. 17(*b*) and 17(*c*), when the viewer accesses a specific channel that provides 3D content during a channel search without prior channel information, the viewer may be notified of the 3D content by an OSD screen preliminarily during channel switching so that the viewer may view the channel in an appropriate mode. Accordingly, the viewer may skip the channel or view the 3D contents of the channel in a changed mode using the OSD screen.

The followings relate to an Electronic Program Guide (EPG) screen.

Figure 18:
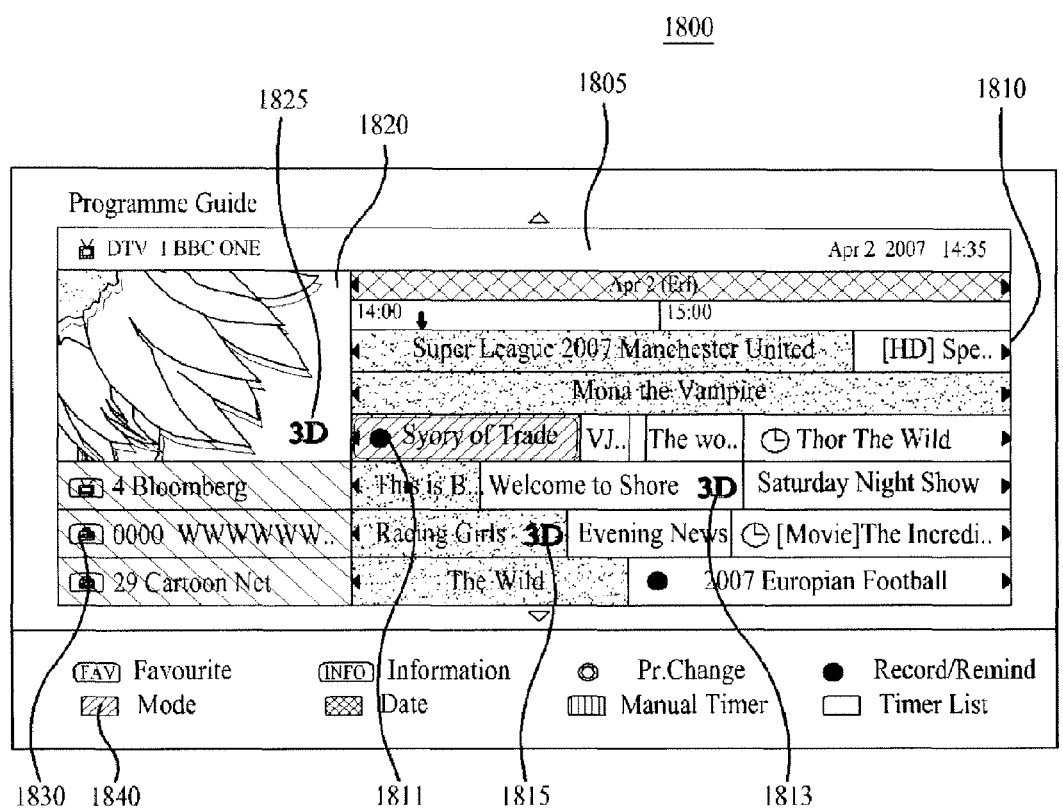
FIG. 18 illustrates an Electronic Program Guide (EPG) screen according to an example embodiment of the present invention.
Figure 19:
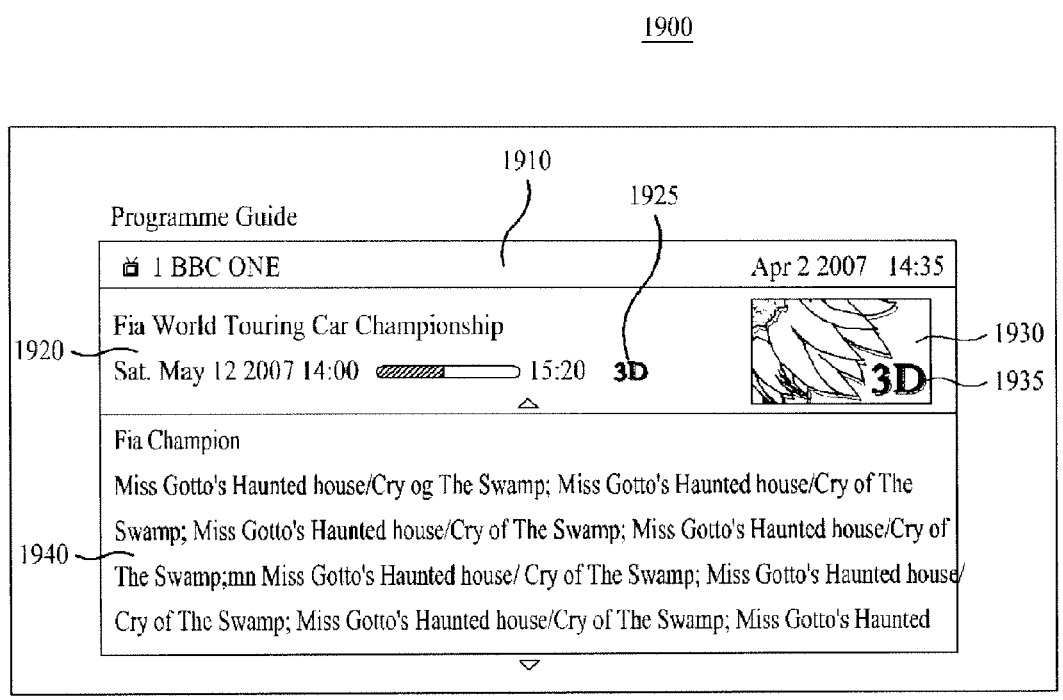
FIG. 19 illustrates an EPG screen according to an example embodiment of the present invention.
Figure 20:
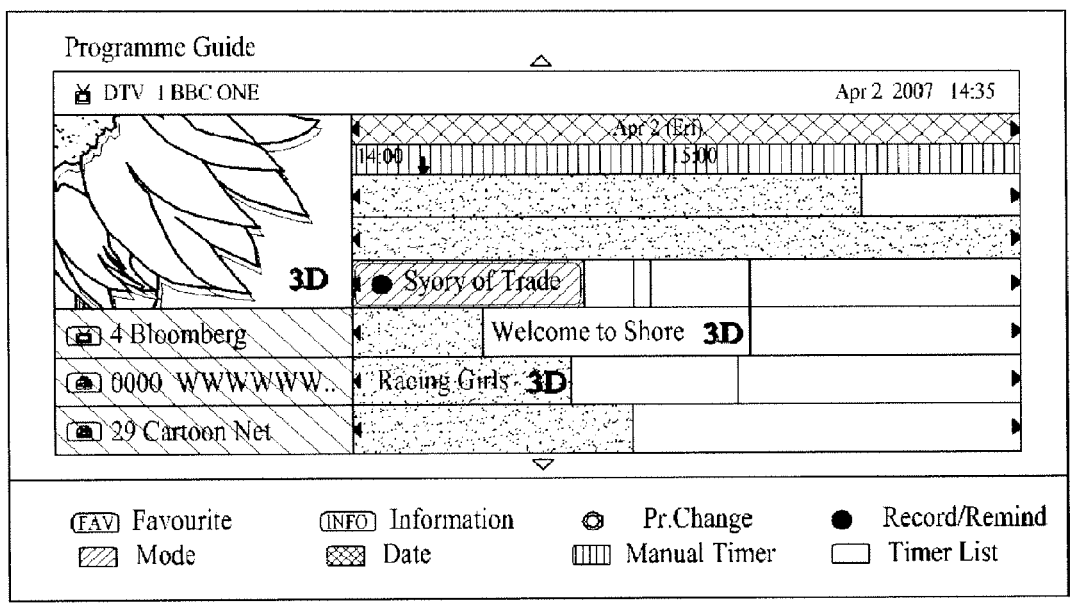
FIG. 20 illustrates an EPG screen according to an example embodiment of the present invention.

FIGS. 18, 19 and 20 illustrate EPG screens according to exemplary embodiments of the present invention. Other embodiments and configurations are also within the scope of the present invention.

FIGS. 18 to 20 are constructed based on at least one of data associated with the 3D service/event parsed/extracted from above-described tables or descriptors by the digital receiver.

As shown in FIG. 18, an EPG screen 1800 may include a first item 1805 indicating a current channel, a second item 1810 in which lists of contents for channels are displayed in a time order, a third item 1820 for displaying a preview image of a selected program 1811 from the second item 1810, a fourth item 1830 including additional information related to the preview image displayed in the third item 1820, and a fifth item 1840 for displaying other menus.

In FIG. 18, the EPG screen 1800 may include 3D indicators in various manners.

A 3D indicator may be displayed over the preview image in the third item 1820 while 3D indicators may not be displayed on the content lists in the second item 1810. Referring to FIG. 18, although a 3D indicator does not reside over a content 1811 selected from the content lists in the second item 1810, a 3D indicator 1825 may be positioned over the preview image in the third item 1820.

3D indicators may be displayed over the content lists in the second item 1810 while there is not a 3D indicator over the preview image in the third item 1820. Referring to FIG. 18, 3D indicators 1813 and 1815 may be displayed over two contents in the content lists of the second item 1810.

Additionally, the above two methods of displaying 3D indicators may be used in combination.

The 3D indicators may be configured as a 2D image or a 3D image. Along with or without the 3D indicators, 3D content may be indicated in a color or using depth information on the EPG screen 1800.

FIG. 19 illustrates a guide screen 1900 that displays details about a specific content selected from the EPG screen shown in FIG. 18.

As shown in FIG. 19, the guide screen 1900 may include a first item 1910 for indicating a current channel and a current time, a second item 1920 for indicating the title of a content and time information about the content, a third item 1930 for displaying a preview image, and a fourth item 1940 for displaying detail information about the content.

If the content includes 3D image data, the signal processing apparatus may display a 3D indicator 1925 or 1935 in at least one of the items 1910, 1920, 1930, 1940. The 3D indicator 1925 may be also configured in a 2D format or in a 3D format.

FIG. 20 illustrates an EPG screen 2000 that lists only 3D contents, as compared to the EPG screen 1800 shown in FIG. 18.

Referring to FIGS. 18 and 20, only the contents attached with the 3D indicators 1811, 1813 and 1815 in the EPG screen of FIG. 18 may be displayed in the EPG screen of FIG. 20, without the remaining 2D contents.

While the 3D contents are indicated in the EPG screen in FIG. 20, the 3D contents may be indicated in any manner other than the EPG screen.

FIGS. 21 and 22 show exemplary EPG screen images according to the present invention.

The image processing apparatus may recognize the presence or absence of a 2D/3D service corresponding to each service using the linkage descriptor of FIGS. 14 and 15. Accordingly, the image processing apparatus recognizes the service pair when 2D and 3D services mapped to each other are present. When providing the service list, the recognized service pair may provide the EPG screen image shown in FIG. 21 or 22.

In this case, the image processing apparatus may be operated according to a user's setup request, or may automatically download the service pair for one service. If the image processing apparatus further downloads the service pair and a user presses the 2D/3D switching button when the stored service or content is reproduced, the image processing apparatus performs switching to a current content so that the image display apparatus reproduces the resultant content, resulting in greater convenience of a user.

The receiver may perform a download reservation such that a user-selected service, an automatic service, or all the content pairs can be received in the receiver. In this case, when the corresponding content is broadcast, a service_id corresponding to the reserved recorded content is found and completely received/stored. The receiver may use the service_id value for each content from the parsed EIT. Therefore, if the user presses the 2D/3D switching button to reproduce the stored content, the image display apparatus performs switching to the corresponding content, and reproduces the resultant content, resulting in greater convenience of the user.

Figures 23, 24:
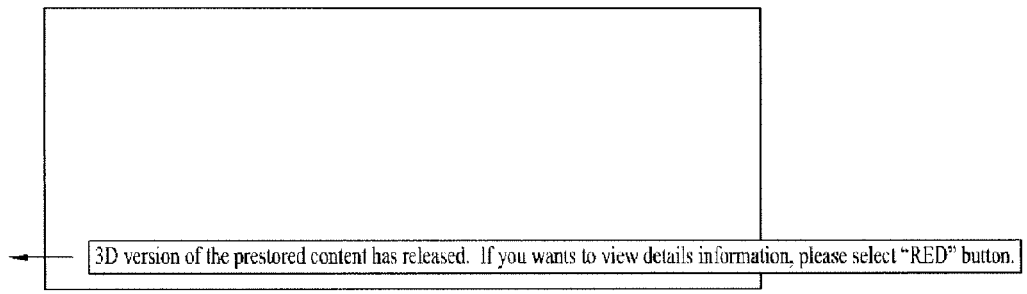
FIG. 23 illustrates an example of UI indicating the presence or absence of a 3D version according to the present invention.
FIG. 24 illustrates another example of the EPG.

FIG. 23 shows an example of UI indicating the presence or absence of a 3D version according to the present invention. FIG. 24 shows another example of the EPG. FIG. 25 is an example of a detailed UI shown in FIG. 24.

Referring to FIG. 23, on the basis of the signaling information of the receiver, if there is a content corresponding to the 2D content stored through an EIT when the user views the legacy broadcast image, i.e., if the 3D version is present, the receiver may enable a text bar to be scrolled as shown in FIG. 23. However, the scope or sprit of the present invention is not limited only to FIG. 23, an additional UI is configured such that information indicating the presence or absence of a 3D version and associated control information may be selected and established on the OSD.

FIG. 24 shows an EPG screen image obtained by parsing at least one of the SDT of FIG. 5 and the EIT of FIG. 8. For example, even when the user presses a specific button (such as RED), the same EPG may be provided. Referring to FIG. 24, the EPG provided in response to a user request provides each content with an indicator indicating whether the corresponding content can identify a 2D or 3D service. Specifically, the present invention may provide information corresponding to a specific content. For example, as can be seen from FIG. 24, the user can recognize information indicating that content of 2D-version Wife Returns Episode #22 begins from the SBS broadcasting station from 12:00, and other information indicating that 3D-version Wife Returns Episode #23 begins from the SBS broadcasting station from 15:30. In this case, the 3D-version content is not always limited only to the same episode, for example, may be a content of other episodes (e.g., #21, #23, Special and the like). In addition, although FIG. 24 exemplarily shows content information corresponding to a specific content, the scope or spirit of the present invention is not limited thereto, the present invention may further provide not only information about other channels but also content information corresponding to other media as necessary.

When the user selects a content of 3D-version Taejo Wang Geon Episode #30 shown in FIG. 24, detailed information and associated processing are shown in FIG. 25. For example, the content selected in FIG. 25 provides information indicating a 3D version of the pre-recorded 2D-version Taejo Wang Geon Episode #30, a reserved recording function, a backward function, etc. In this case, although the receiver is not shown in the drawings, details information of the corresponding content may also be provided to the receiver, for example, synopsis information, episode information, broadcast start time information, broadcast end time information, thumbnail information, and the like.

A video format transitions will hereinafter be described with reference to the above-described contents.

A frame compatible stereoscopic 3DTV service may switch video format between two of the frame compatible stereoscopic video formats, or it may switch to or from one of the frame compatible stereoscopic video formats to or from an HDTV video format (i.e. a non-frame compatible stereoscopic 3DTV video format). A format switch between the Side-by-Side and Top-and-Bottom frame packing arrangements is unlikely to be applied, but such a transition is not forbidden.

A video format switch shall be applied only at a Random Access Point (RAP) with an Instantaneous Decoding Refresh (IDR) video frame. Due to the lack of tight synchronization between occurrences of the PMT in the TS and occurrences of pictures in the video stream, there is an inconsistency for a short time if the video format is switched during the running frame compatible stereoscopic 3DTV service. The carriage of HDTV (i.e. non-3DTV) video format content usually means that the frame packing arrangement Supplemental Enhancement Information (SEI) message is not applicable. However, an IRD that is presented with such a format switch might not handle the transition correctly due to the temporary inconsistency with the information contained in the previous occurrence of the PMT. This is depicted in FIG. 5 with the example of a video format switch from 1080i 25 Hz Side-by-Side frame compatible stereoscopic 3DTV video to 1080i 25 Hz HDTV video.

In this example there is an inconsistency between the information carried in the last occurrence of the PMT before the video format switch, and the information conveyed by the frame packing arrangement SEI message after the video format switch. This inconsistency could cause the IRD to assume the incorrect video format during the period of inconsistency, the length of which is not known due to the mentioned lack of tight synchronization between the PMT and coded video pictures.

Format transition assistance signaling is defined that enables assurance of the robustness of the decoding process in the IRD. It is recommended that this format transition assistance signaling is applied when a frame compatible stereoscopic 3DTV service includes periods of content in a non-3DTV video format.

The format transition assistance signaling consists of the inclusion of frame packing arrangement SEI messages also in the video stream containing HDTV format video content, with the field frame_packing_arrangement_cancel_flag set to 1 to signal affirmatively that no frame compatible stereoscopic 3DTV video format is being transmitted currently.

In order to maximize the robustness of the decoding process in the IRD, it is recommended that the frame compatible stereoscopic 3DTV service applies the frame packing arrangement SEI message also during carriage of the HDTV format, at least for a period of two seconds before and after a format switch between the HDTV video format and the frame compatible stereoscopic 3DTV video format.

When a video format transition occurs either to or from an HDTV video format, the the frame_packing_arrangement_cancel_flag in the frame packing arrangement SEI message should be set to '1', indicating that a non-3DTV video format is being carried, for a period of at least two seconds after the transition from a frame compatible stereoscopic 3DTV video format to an HDTV video format has occurred, or for at least two seconds before the transition from an HDTV video format to a frame compatible stereoscopic 3DTV video format will occur.

Carriage of the frame packing arrangement SEI message with frame_packing_arrangement_cancel_flag setting to '1' may persist during the complete duration of HDTV video format content, at the discretion of the service provider. As well as enhancing the robustness of the handling by the IRD of video format transitions within a frame compatible stereoscopic 3DTV service, it also provides robustness in the case when the IRD hops from another service to a frame compatible stereoscopic 3DTV service. In some circumstances it might be more convenient to continue to apply this signaling than to cease to convey it.

In any case the frame packing arrangement SEI message signaling shall be consistent with the video format carried, and takes precedence over other signaling as regards video format. The temporary inconsistencies with the PMT mentioned above may occur, and are alleviated by the application of format transition assistance signaling as specified in the present section.

The present invention provides a method for allowing a 3DTV to process signaling information for a stereoscopic video broadcast service, and a scheme for implementing the same. Especially, the present invention provides a method for receiving a broadcast service using the corresponding signaling information, and a method for operating and implementing a 3DTV to control the stereoscopic display output.

In addition, the present invention can identify a 3DTV service and a 2D legacy TV service through independent and separate logical channels (virtual channels), such that the user can easily perform 2D/3D conversion through channel switching.

In other words, under the condition that a 2D service and a 3D service are mixed with each other under the DTV broadcast environment, the present invention can recognize the relationship between the 2D service and the 3D service so as to recognize the presence or absence of 2D and 3D services. As a result, if the user desires service conversion to a 2D or 3D service, the present invention can enable the user to easily perform the 2D or 3D conversion, resulting in greater convenience of the user.

Exemplary embodiments of the present invention have the following effects. First, although a 3D service and a 2D service are mixed with each other, the present invention can effectively identify the 3D service. Second, the present invention can properly perform signaling of 3D services that are manufactured and provided according to a variety of schemes. Third, upon receiving a switching request between a 2D service and a 3D service, the present invention can properly perform 2D-to-3D switching or 3D-to-2D switching. As described above, the present invention may apply to a totally or a partially of a digital broadcasting system.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of transmitting a broadcast signal in a broadcast system for providing a 3-dimensional, 3D, service, the method comprising:
   encoding video data for a 3D service into at least one stream;
   generating first service information including information specifying whether a service corresponds to a 2D service or the 3D service, second service information including stream information, and third service information indicating that a future event is in 3D,
   wherein the stream information includes horizontal and vertical sampling information for the 3D service; and
   transmitting a broadcast signal including the at least one encoded stream and the generated first, second, and third service information,
   wherein the broadcast signal further includes a supplemental enhancement information (SEI) message that includes a frame packing arrangement data specifying a 2D service portion in the broadcast signal in addition to the first service information in order to provide frame accurate signaling for a situation in which a temporal inconsistency with the first service information for a current viewing mode occurs when a viewing mode transits from 3D to 2D or 2D to 3D.

2. The method of claim 1, wherein the at least one stream include base view video data and additional view video data,
   wherein the base view video data is encoded using MPEG-2 video coding, and
   wherein the additional video data is encoded using AVC video coding.

3. The method of claim 2, wherein the first service information includes a stream type information specifying whether a video stream carries the base view video data or the additional view video data.

4. The method of claim 3, wherein the SEI message is transmitted within the base video data.

5. An apparatus of receiving a broadcast signal in a broadcast system for processing a 3-dimensional, 3D, service, the apparatus comprising:
- a receiving unit configured to receive a broadcast signal including at least one stream and service information for signaling a broadcast service; and
- a decoding unit configured to decode video data for a 3D service or a 2-dimensional, 2D, service from the at least one stream,
- wherein the service information comprises first service information including information specifying whether a service corresponds to a 2D service or the 3D service, second service information including stream information, and third service information indicating that a future event is in 3D, and
- wherein the stream information includes horizontal and vertical sampling information for the 3D service,
- wherein the broadcast signal further includes a supplemental enhancement information (SEI) message that includes a frame packing arrangement data specifying a 2D service portion in the broadcast signal in addition to the first service information in order to provide frame accurate signaling for a situation in which a temporal inconsistency with the first service information for a current viewing mode occurs when a viewing mode transits from 3D to 2D or 2D to 3D.

6. The apparatus of claim 5, wherein the at least one stream include base view video data and additional view video data,
- wherein the base view video data is encoded using MPEG-2 video coding, and
- wherein the additional video data is encoded using AVC video coding.

7. The apparatus of claim 6, wherein the first service information includes a stream type information specifying whether a video stream carries the base view video data or the additional view video data.

8. The apparatus of claim 7, wherein the SEI message is transmitted within the base video data.

* * * * *